(12) United States Patent
Rabnawaz

(10) Patent No.: US 11,802,204 B2
(45) Date of Patent: Oct. 31, 2023

(54) THERMOSET OMNIPHOBIC COMPOSITIONS WITH IMPROVED BARRIER PROPERTIES, RELATED ARTICLES, AND RELATED METHODS

(71) Applicant: BOARD OF TRUSTEES OF MICHIGAN STATE UNIVERSITY, East Lansing, MI (US)

(72) Inventor: Muhammad Rabnawaz, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 1029 days.

(21) Appl. No.: 16/535,689

(22) Filed: Aug. 8, 2019

(65) Prior Publication Data

US 2020/0048459 A1     Feb. 13, 2020

Related U.S. Application Data

(60) Provisional application No. 62/717,099, filed on Aug. 10, 2018.

(51) Int. Cl.
| | |
|---|---|
| *C08L 75/04* | (2006.01) |
| *C08G 18/32* | (2006.01) |
| *C08G 18/48* | (2006.01) |
| *C08G 18/38* | (2006.01) |
| *C08G 18/75* | (2006.01) |

(Continued)

(52) U.S. Cl.
CPC .............. *C08L 75/04* (2013.01); *B05D 3/108* (2013.01); *B05D 5/08* (2013.01); *C08G 18/10* (2013.01); *C08G 18/244* (2013.01); *C08G 18/289* (2013.01); *C08G 18/3206* (2013.01); *C08G 18/384* (2013.01); *C08G 18/4009* (2013.01); *C08G 18/48* (2013.01); *C08G 18/4829* (2013.01); *C08G 18/61* (2013.01); *C08G 18/672* (2013.01); *C08G 18/71* (2013.01); *C08G 18/73* (2013.01); *C08G 18/757* (2013.01); *C08G 18/758* (2013.01); *C08G 18/7621* (2013.01); *C08G 18/7642* (2013.01); *C08G 18/7831* (2013.01); *C08G 18/792* (2013.01); *C08L 75/02* (2013.01); *C08L 75/08* (2013.01); *C08L 83/04* (2013.01); *C09D 175/02* (2013.01); *C09D 175/08* (2013.01); *C09D 183/10* (2013.01); *B05D 3/0254* (2013.01); *B05D 2503/00* (2013.01); *C08G 77/458* (2013.01);

(Continued)

(58) Field of Classification Search
CPC ...... C08L 75/04; C08L 83/04; C08L 2201/14; C08L 2312/00; C08L 75/02; C08L 75/08; B05D 3/108; B05D 5/08; B05D 3/0254; B05D 2503/00; C08G 18/3206; C08G 18/384; C08G 18/48; C08G 18/757; C08G 18/758; C08G 18/7621; C08G 18/7642; C08G 18/71; C08G 77/458; C08G 77/46; C08G 18/10; C08G 18/244; C08G 18/289; C08G 18/4009; C08G 18/4829; C08G 18/61; C08G 18/672; C08G 18/7831; C08G 18/792; C08G 18/73; C09D 183/10; C09D 175/02; C09D 175/08

See application file for complete search history.

(56) References Cited

U.S. PATENT DOCUMENTS

| | | |
|---|---|---|
| 5,049,627 A | 9/1991 | Edelman |
| 5,853,886 A | 12/1998 | Pinnavaia et al. |

(Continued)

FOREIGN PATENT DOCUMENTS

| | | |
|---|---|---|
| EP | 0469316 A2 | 2/1992 |
| KR | 2012-0073017 A | 7/2012 |

(Continued)

OTHER PUBLICATIONS

Chen et al., Preparation and anticorrosive performances of polysiloxane-modified epoxy coatings based on polyaminopropylmethylsiloxane-containing amine curing agent, J. Coatings Technol. Res., 8(4):481-7 (Jul. 2011).

Sommer et al., A preliminary study on the properties and fouling-release performance of siloxane-polyurethane coatings prepared from poly(dimethylsiloxane) (PDMS) macromers, Biofouling, 26(8):961-72 (Nov. 2010).

(Continued)

*Primary Examiner* — Rabon A Sergent

(57) ABSTRACT

The disclosure relates to a thermoset omniphobic composition (such as an omniphobic polyurethane or epoxy composition) which includes a thermoset polymer with first, second, and third backbone segments. The first, second, and third backbone segments can correspond to urethane or urea reaction products of polyisocyanate(s), amine-functional omniphobic polymer(s), and polyol(s), respectively, for omniphobic polyurethanes. Similarly, the first, second, and third backbone segments can correspond to urea or beta-hydroxy amine reaction products of polyamine(s), isocyanate-functional omniphobic polymer(s), and polyepoxide(s), respectively, for omniphobic epoxies. The thermoset omniphobic composition has favorable omniphobic properties, for example as characterized by water and/or oil contact and/or sliding angles. The thermoset omniphobic composition further has favorable barrier properties, for example with respect to water vapor and oxygen transmission as well as water absorption. The thermoset omniphobic composition can be used as a coating on any of a variety of substrates to provide omniphobic properties to a surface of the substrate. Such omniphobic coatings can be scratch resistant, ink/paint resistant, and optically clear.

41 Claims, 3 Drawing Sheets

(51) Int. Cl.

| | |
|---|---|
| *C08G 18/76* | (2006.01) |
| *C08L 83/04* | (2006.01) |
| *B05D 3/10* | (2006.01) |
| *B05D 5/08* | (2006.01) |
| *C08G 18/73* | (2006.01) |
| *C09D 175/02* | (2006.01) |
| *C08G 18/40* | (2006.01) |
| *C08G 18/79* | (2006.01) |
| *C08G 18/71* | (2006.01) |
| *C08G 18/67* | (2006.01) |
| *C08G 18/61* | (2006.01) |
| *C08G 18/24* | (2006.01) |
| *C08L 75/08* | (2006.01) |
| *C09D 183/10* | (2006.01) |
| *C08G 18/28* | (2006.01) |
| *C09D 175/08* | (2006.01) |
| *C08G 18/10* | (2006.01) |
| *C08L 75/02* | (2006.01) |
| *C08G 18/78* | (2006.01) |
| *C08G 77/458* | (2006.01) |
| *B05D 3/02* | (2006.01) |
| *C08G 77/46* | (2006.01) |

(52) U.S. Cl.
CPC .......... *C08G 77/46* (2013.01); *C08L 2201/14* (2013.01); *C08L 2312/00* (2013.01)

(56) References Cited

U.S. PATENT DOCUMENTS

| | | | |
|---|---|---|---|
| 5,902,854 A | 5/1999 | Kelley et al. | |
| 11,118,003 B2* | 9/2021 | Rabnawaz | C08G 18/75 |
| 11,135,617 B2* | 10/2021 | Rabnawaz | B05D 3/102 |
| 2002/0010270 A1 | 1/2002 | Czech et al. | |
| 2005/0119371 A1 | 6/2005 | Drzal et al. | |
| 2006/0192183 A1 | 8/2006 | Klyszcz et al. | |
| 2013/0234070 A1 | 9/2013 | Mowrer | |
| 2013/0289134 A1 | 10/2013 | Hans et al. | |
| 2014/0296379 A1 | 10/2014 | Christiano et al. | |
| 2015/0086713 A1 | 3/2015 | Chen et al. | |
| 2015/0314941 A1 | 11/2015 | Ramadas et al. | |
| 2016/0145468 A1 | 5/2016 | Wills et al. | |
| 2016/0312059 A1 | 10/2016 | Suleiman et al. | |
| 2016/0312064 A1 | 10/2016 | Iezzi | |
| 2020/0347179 A1* | 11/2020 | Rabnawaz | C08G 18/75 |
| 2022/0064366 A1 | 3/2022 | Rabnawaz et al. | |

FOREIGN PATENT DOCUMENTS

| | | |
|---|---|---|
| WO | WO-03/093352 A1 | 11/2003 |
| WO | WO-2017/113149 A1 | 7/2017 |
| WO | WO-2019/199713 A1 | 10/2019 |
| WO | WO-2020/142578 A1 | 7/2020 |
| WO | WO-2020/160089 A1 | 8/2020 |
| WO | WO-2020/167714 A1 | 8/2020 |
| WO | WO-2020/180760 A1 | 9/2020 |

OTHER PUBLICATIONS

Thanikai Velan et al., Aliphatic amine cured PDMS-epoxy interpenetrating network system for high performance engineering applications—Development and characterization, Bull. Mater. Sci., 23(5):425-9 (Oct. 2000).

U.S. Appl. No. 16/486,902, Rabnawaz et al., Methods for Forming Omniphobic Thermoset Compositions and Related Articles, filed Aug. 19, 2019.

U.S. Appl. No. 16/962,388, Rabnawaz et al., Omniphobically Coated Fluid Channels and Related Methods, filed Jul. 15, 2020.

U.S. Appl. No. 16/963,896, Rabnawaz et al., Omniphobic Polyurethane Compositions, Related Articles, and Related Methods, Jul. 22, 2020.

* cited by examiner

THERMOSET OMNIPHOBIC COMPOSITIONS WITH IMPROVED BARRIER PROPERTIES, RELATED ARTICLES, AND RELATED METHODS

CROSS REFERENCE TO RELATED APPLICATION

Priority is claimed to U.S. Provisional Application No. 62/717,099 (filed Aug. 10, 2018), which is incorporated herein by reference in its entirety.

STATEMENT OF GOVERNMENT INTEREST

None.

BACKGROUND OF THE DISCLOSURE

Field of the Disclosure

The disclosure relates to a thermoset omniphobic composition (such as an omniphobic polyurethane or epoxy composition) which includes a thermoset polymer with first, second, and third backbone segments. The first, second, and third backbone segments can correspond to urethane or urea reaction products of polyisocyanate(s), amine-functional omniphobic polymer(s), and polyol(s), respectively, for omniphobic polyurethanes. Similarly, the first, second, and third backbone segments can correspond to urea or beta-hydroxy amine reaction products of polyamine(s), isocyanate-functional omniphobic polymer(s), and polyepoxide(s), respectively, for omniphobic epoxies.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In one aspect, the disclosure relates to a thermoset omniphobic composition comprising: a thermoset polymer comprising a crosslinked backbone, the crosslinked backbone comprising: (i) first backbone segments, (ii) second backbone segments, (iii) third backbone segments, (iv) first linking groups linking the first backbone segments and the third backbone segments, and (v) second linking groups linking the first backbone segments and the second backbone segments. The first backbone segments have a structure corresponding to a (polymerization) reaction product (e.g., polymerization reaction product when incorporated into the thermoset network) from at least one first thermosetting component (e.g., monomer, comonomer, prepolymer, oligomer, polymer with 2+ polymerizable functional groups) reactive with at least one of a second thermosetting component and a functionalized omniphobic polymer having a glass transition temperature ($T_g$) of 70° C. or 50° C. or less. The second backbone segments have a structure corresponding to a (polymerization) reaction product from at least one functionalized omniphobic polymer having a glass transition temperature ($T_g$) of 70° C. or 50° C. or less, the functionalized omniphobic being reactive with the first thermosetting component (e.g., having a functional group such as an epoxide group, amino group, hydroxyl group, or carboxylic group). The functionalized omniphobic polymer can be a "polymerization reaction product" when incorporated into the thermoset network or a "reaction product" when a monofunctional functionalized omniphobic polymer is incorporated as a pendant or terminal chain in the thermoset network. The third backbone segments have a structure corresponding to a (polymerization) reaction product (e.g., polymerization reaction product when incorporated into the thermoset network) from at least one second thermosetting component (e.g., monomer, comonomer, prepolymer, oligomer, polymer with 2+ polymerizable functional groups) reactive with the first thermosetting component. The first linking groups have a structure corresponding to a reaction product of a first functional group of the first thermosetting component and a second functional group of the second thermosetting component. The second linking groups have a structure corresponding to a reaction product of the first functional group of the first thermosetting component and a third functional group of the functionalized omniphobic polymer. The first functional group, the second functional group, and the third functional group are different from each other (e.g., isocyanate, hydroxy, and amino, respectively, for polyurethane with amino-PDMS; amino, isocyanate, and epoxide, respectively for polyurea resin with epoxy-PDMS; amino, epoxide, and isocyanate respectively for epoxy resin with isocyanate-PDMS). In some embodiments, the first and third functional groups have a higher reaction rate with each other relative to the first and second functional groups with each other (e.g., under the same reaction/curing conditions; second and third groups can be generally non-reactive). The thermoset omniphobic composition generally has a homogeneous structure, for example a homogenous thermoset solid with the first, second, and third backbone segments being generally evenly distributed throughout the composition (e.g., in contrast to a "self-stratified" structure with a siloxane (or other omniphobic polymer group) rich surface and bulk thermoset region with little or no siloxane (or other omniphobic polymer group)). The second backbone segments are present in an amount ranging from 0.01 wt. % to 20 wt. % (e.g., 0.2-8 wt. % or 1-5 wt. % more preferably) relative to the thermoset polymer.

Various refinements of the disclosed thermoset omniphobic composition are possible.

In a refinement, the functional group of the functionalized omniphobic polymer is selected from the group consisting of epoxide groups, amino groups, isocyanate groups, hydroxyl groups, carboxylic groups, and combinations thereof (e.g., for multifunctional functionalized omniphobic polymers). Several specific functionalized omniphobic polymer functional groups and their complementary groups in the first thermosetting component are illustrated as follows. Isocyanate groups in the functionalized omniphobic polymer can react with amino groups of the first thermosetting component to make a urea linkage, such as in an epoxy thermosets. Amino groups in the functionalized omniphobic polymer can react with isocyanate groups in the first thermosetting component to make a urea link, such as in a polyurethane thermoset. Amino groups in the functionalized omniphobic polymer can react with epoxide groups in the first thermosetting component to make beta-hydroxy tertiary amine links, such as in an epoxy thermoset. Amino groups in the functionalized omniphobic polymer can react with carboxylic groups in the first thermosetting component to make an amide link, such as in an acrylic thermoset. Amino groups in the functionalized omniphobic polymer can react with isocyanate groups of the first thermosetting component to make a urea linkage, such as in an epoxy thermoset. Amino groups in the functionalized omniphobic polymer can react with isocyanate groups of the first thermosetting component to make a urea linkage, such as in an epoxy thermoset cured with anhydrides having added isocyanate groups to the anhydride monomer units. Epoxide groups in the functionalized omniphobic polymer can react with amino groups in the first thermosetting component to make beta-hydroxy tertiary amine links, such as in an epoxy thermoset. Hydroxyl groups in the functionalized omniphobic polymer can react with isocyanate groups in the first thermosetting component to make a urethane link, such as in a polyurethane thermoset. Hydroxyl groups in the functionalized omniphobic polymer can react with carboxylic groups in the first thermosetting component to make an ester link, such as in an acrylic thermoset. Carboxylic groups in the functionalized omniphobic polymer can react with hydroxyl groups in the first thermosetting component to make an ester link, such as in a polyurethane thermoset. Carboxylic groups in the functionalized omniphobic polymer can react with amino groups in the first thermosetting component to make an amide link, such as in an epoxy thermoset.

In a refinement, the functionalized omniphobic polymer is selected from the group consisting of functionalized polysiloxanes, functionalized polyperfluoroethers, functionalized polybutadienes, functionalized polyisobutenes ("PIB"), functionalized branched polyolefins, functionalized low molecular weight polyolefins, functionalized poly(meth) acrylates (e.g., also including $C_2$-$C_{16}$ pendant alkyl groups), and combinations thereof. In a further refinement, the functionalized omniphobic polymer can be used in combination with a low melting point (e.g., melting point from 0-60° C.) hydrophilic polymer/oligomer such as amine-functional poly(ethylene glycol) methyl ether ("PEO").

In a refinement, the functionalized omniphobic polymer comprises a mono-functional functionalized omniphobic polymer (e.g., having only a single functional group reactive with the first thermosetting component, such as at a terminal location of the omniphobic polymer; such as a mono-functional polysiloxane).

In a refinement, the functionalized omniphobic polymer comprises a di-functional functionalized omniphobic polymer (e.g., having only two functional groups reactive with the first thermosetting component, such as at terminal locations of the omniphobic polymer; such as a di-functional polysiloxane).

In a refinement, the functionalized omniphobic polymer comprises a poly-functional functionalized omniphobic polymer (e.g., having three, four, or more functional groups reactive with the first thermosetting component, such as at terminal locations of the omniphobic polymer and/or as pendant groups along the backbone of the omniphobic polymer; such as a poly-functional polysiloxane).

In a refinement, the functionalized omniphobic polymer is a liquid at a temperature in a range from −150° C. to 70° C., −150° C. to 50° C., or from −130° C. to 40° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature ($T_m$) below 10° C. or 20° C.). The third functional groups of the functionalized omniphobic polymer can be terminal and/or pendant from the polymer.

In a refinement, the functionalized omniphobic polymer has a molecular weight ranging from 300 to 50,000 g/mol. The functionalized omniphobic polymer can have any suitable molecular weight in view of desired glass transition temperature, for example having a molecular weight ranging from 300 to 50,000 g/mol. In various embodiment, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Some embodiments can include a blend of two or more functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functionalized polysiloxane can provide better water and oil repellency than a di-functionalized polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

In a refinement, the first thermosetting component and the second thermosetting component together correspond to a thermoset polyurethane. For example, the first and second thermosetting components can include at least one polyisocyanate and at least one polyol, where at least one component is reactive with the functional group of the functionalized omniphobic polymer.

In a refinement, the first thermosetting component comprises a polyisocyanate or a polyol; and the second thermosetting component comprises the other of the polyisocyanate and the polyol. The polyisocyanate can be di-, tri-, or higher functional such as a diisocyanate, triisocyanate, blend of multiple polyisocyanates with same or different functionality. The polyol can be di-, tri-, or higher functional such as a diol, triol, blend of multiple polyols with same or different functionality. At least one polyisocyanate or polyol has a functionality greater than two for crosslinking.

The "first" and "second" labels for the thermosetting components are interchangeable with respect to their ability to react with each other and form a crosslinked, thermoset network portion of the final thermoset polymer, which in the case of a polyisocyanate/polyol combination corresponds to a urethane linking group as the first linking group L1. The distinction is that the first functional group of the first thermosetting component is also capable of reacting with the third functional group of the functionalized omniphobic polymer, while the second functional group of the second thermosetting component could (but need not) also be capable of reacting with the third functional group of the functionalized omniphobic polymer. In some embodiments, the first and third functional groups have a higher reaction rate with each other relative to the first and second functional groups with each other. In some embodiments, the second and third functional groups do not (substantially) react with each other. For example, the polyisocyanate can be first thermosetting component when the functionalized omniphobic polymer has an isocyanate-reactive functional group (e.g., such as an amino group to form a urea group as the second linking group L2, or such as a hydroxyl group for form a urethane group as second linking group L2), in which case the polyol can be the second thermosetting component and need not react (or be unable to react) with the functionalized omniphobic polymer. Similarly, the polyol can be first thermosetting component when the functionalized omniphobic polymer has a hydroxyl-reactive functional group (e.g., such as a carboxylic group to form an ester group as the second linking group L2), in which case the polyisocyanate can be the second thermosetting component and need not react (or be unable to react) with the functionalized omniphobic polymer.

In a further refinement, the first thermosetting component comprises the polyisocyanate, and the first functional group of the first thermosetting component comprises an isocyanate group; the second thermosetting component comprises the polyol, and the second functional group of the second thermosetting component comprises a hydroxyl group; and the third functional group of the functionalized omniphobic polymer comprises an amino group.

In a further refinement, the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In a further refinement, the polyol is selected from the group consisting of polyether polyols, hydroxlated (meth) acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols, isosorbide, and combinations thereof.

In a refinement, the first thermosetting component and the second thermosetting component together correspond to a thermoset epoxy. For example, the first and second thermosetting components can include at least one polyepoxide and at least one amine (monoamine or polyamine) or anhydride (e.g., forming a beta-hydroxy ester reaction product link, such as at high reaction temperatures), where at least one component is reactive with the third functional group of the functionalized omniphobic polymer.

In a refinement, the first thermosetting component comprises a polyepoxide or an amine; and the second thermosetting component comprises the other of the polyepoxide and the amine. The polyepoxide can be di-, tri-, or higher functional such as a diepoxide, triepoxide, blend of multiple polyisocyanates with same or different functionality. The amine can be mono-, di-, tri-, or higher functional such as a monoamine, diamine, triamine, blend of multiple amines with same or different functionality. At least one polyepoxide has a functionality greater than two or at least one amine has a functionality greater than one for crosslinking (i.e., since a single —NH$_2$ primary amino group can react with two epoxide groups, either some species with three or more epoxide groups or two or more amino groups (which can form four or more bonds with epoxides) are used for crosslinking). Typically a diepoxide and a diamine are used.

The "first" and "second" labels for the thermosetting components are interchangeable with respect to their ability to react with each other and form a crosslinked, thermoset network portion of the final thermoset polymer, which in the case of a polyepoxide/amine combination corresponds to a beta-hydroxy (tertiary) amine linking group as the first linking group L1. The term "beta-hydroxy amine" generally refers a structure in which the hydroxy group is attached to the beta carbon, which is attached to the alpha-carbon, which is directly attached to the nitrogen atom of the reacted amine. The beta-hydroxy amine can be represented by the structure —CH(OH)—CH$_2$—NR$_1$R$_2$ in the cured epoxy thermoset, where R$_1$ and R$_2$ can be another beta-hydroxy group or the remainder of the amine thermosetting component. The distinction is that the first functional group of the first thermosetting component is also capable of reacting with the third functional group of the functionalized omniphobic polymer, while the second functional group of the second thermosetting component could (but need not) also be capable of reacting with the third functional group of the functionalized omniphobic polymer. In some embodiments, the first and third functional groups have a higher reaction rate with each other relative to the first and second functional groups with each other. In some embodiments, the second and third functional groups do not (substantially) react with each other. For example, the polyepoxide can be first thermosetting component when the functionalized omniphobic polymer has an epoxide-reactive functional group (e.g., such as an amino group to form a beta-hydroxy amine group as the second linking group L2), in which case the amine can be the second thermosetting component and need not react (or be unable to react) with the functionalized omniphobic polymer. Similarly, the amine can be first thermosetting component when the functionalized omniphobic polymer has an amine-reactive functional group (e.g., such as an isocyanate group to form a urea group as the second linking group, such as an epoxide group to form a beta-hydroxy amine group as the second linking group, such as a carboxylic acid group to form an amide group as the second linking group L2), in which case the polyepoxide can be the second thermosetting component and need not react (or be unable to react) with the functionalized omniphobic polymer.

In a further refinement, the first thermosetting component comprises the amine, and the first functional group of the first thermosetting component comprises an amino group; the second thermosetting component comprises the polyepoxide, and the second functional group of the second thermosetting component comprises an epoxide group; and the third functional group of the functionalized omniphobic polymer comprises an isocyanate group. In a further refinement, the third functional group of the functionalized omniphobic polymer alternatively or additionally can comprise an epoxide group reactive with the amino group of the first thermosetting component (e.g., thus forming a component of an epoxy thermoset).

In a further refinement, the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached.

In a further refinement, the amine is selected from the group consisting of polyamine-substituted aromatic hydrocarbons, aliphatic hydrocarbons, cycloaliphatic hydrocarbons, ethers thereof, esters thereof, imines thereof, and combinations thereof. The amine can include hydrocarbons with two or more amino groups and one or more aromatic, aliphatic, cycloaliphatic, ether, ester, and/or imine groups in the hydrocarbon to which the amino groups are attached.

In a refinement, the first thermosetting component and the second thermosetting component together correspond to an acrylic thermoset. An acrylic thermoset can include acrylic or methacrylic oligomer or polymer chains having grafted (e.g., randomly, statistically, gradiently or blockwise) reactive groups, such as carboxylic, carboaxmide, hydroxyl, acrylic double bond, and/or epoxide groups. These groups can react with themselves or with co-reactants. Examples include carboxyl-diepoxides, hydroxyl-epoxy and urea or melamine condensation products, alkoxymethyl carboxamide-self-reactive, epoxy, alkyd, functional vinyl, allylic double bond-peroxide catalyzed, and allylic double bond-peroxide catalyzed grafted reactive groups.

In a refinement, the first backbone segments are present in an amount ranging from 10 wt. % to 90 wt. % relative to the thermoset polymer; the second backbone segments are present in an amount ranging from 0.01 wt. % to 20 wt. % (e.g., 0.2-8 wt. % or 1-5 wt. % more preferably) relative to the thermoset polymer; and/or the third backbone segments are present in an amount ranging from 10 wt. % to 90 wt. % relative to the thermoset polymer. More generally, the first, second, and third backbone segments can be incorporated into the thermoset omniphobic coating in a variety of relative weight amounts. In an embodiment, the first backbone segments are present in an amount ranging from 10 wt. % to 90 wt. % relative to the thermoset omniphobic coating (e.g., at least 10, 15, or 20 wt. % and/or up to 30, 40, 50, 60, 70, 80, or 90 wt. %; such as 30 wt. % to 70 wt. %). In an embodiment, the second backbone segments are present in an amount ranging from 0.01 wt. % to 20 wt. % relative to the thermoset omniphobic coating (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %). In an embodiment, the third backbone segments are present in an amount ranging from 10 wt. % to 90 wt. % relative to the thermoset omniphobic coating (e.g., at least 10, 20, 30, 40, or 50 wt. % and/or up to 70, 80, or 90 wt. %, such as 30 wt. % to 70 wt. %). The foregoing ranges can apply as well to the relative weight amounts of the first thermosetting component, the functionalized omniphobic polymer, and the second thermosetting component relative to the total weight amount of the three components before crosslinking reactions and/or relative to all monomeric, oligomeric, and polymeric reaction components added thereto. These components can be derived from renewable as well as non-renewable resources.

In a refinement, the thermoset omniphobic composition further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

In a refinement, the thermoset omniphobic composition (e.g., in the form of a coating) has a water contact angle in a range from 90° to 120°. In a refinement, the thermoset omniphobic composition (e.g., in the form of a coating) has an oil contact angle in a range from 1° to 65°. In a refinement, the thermoset omniphobic composition (e.g., in the form of a coating) has a water sliding angle in a range from 1° to 30° for a 75 µl droplet. In a refinement, the thermoset omniphobic composition (e.g., in the form of a coating) has an oil sliding angle in a range from 1° to 20° for a 25 µl droplet.

More generally, the omniphobic properties of the thermoset omniphobic composition or corresponding coating (e.g., for the cured composition, such as on a substrate) can be characterized in terms of one or more contact angles and/or sliding angles for water and/or oil droplets (e.g., vegetable oil and/or hexadecane) on the thermoset coating (e.g., as a coating on a substrate). The following ranges are representative of compositions and coatings according to the disclosure which display favorable omniphobic properties. In an embodiment, the composition or coating has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition or coating has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition or coating has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition or coating has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic composition or coating can be higher when nanofillers (e.g., clay, silica, etc.) are included in the composition as compared to a corresponding composition without any nanofillers. For example, in the case of compositions or coatings further including one or more nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water, and from 20° to 120° for oil. Similarly, the sliding angles for water on the surface of nanofiller-containing compositions or coatings can range from 0° or 1° to 20° for a 25 µl droplet.

In a refinement, the thermoset omniphobic composition has a relative permeability for water vapor of 0.9, 0.7, or 0.3 or less (e.g., 0.9, 0.8, 0.7, 0.6, 0.5, 0.4, 0.3, 0.25, 0.2, 0.15, 0.1, 0.05, 0.02, 0.01, or 0.001 or less and/or at least 0.001, 0.01, 0.02, 0.05, 0.1, or 0.15), relative to a corresponding thermoset composition without the functionalized omniphobic polymer; and the thermoset omniphobic composition has a relative permeability for oxygen gas of 0.9, 0.7, or 0.3 or less (e.g., 0.9, 0.8, 0.7, 0.6, 0.5, 0.4, 0.3, 0.25, 0.2, 0.15, 0.1, 0.05, 0.02, 0.01, or 0.001 or less and/or at least 0.001, 0.01, 0.02, 0.05, 0.1, or 0.15), relative to a corresponding thermoset composition without the functionalized omniphobic polymer. In a refinement, the thermoset omniphobic composition has a relative absorption for water vapor of 0.9, 0.7, or 0.3 or less (e.g., 0.9, 0.8, 0.7, 0.6, 0.5, 0.4, 0.3, 0.25, 0.2, 0.15, 0.1, 0.05, 0.02, 0.01, or 0.001 or less and/or at least 0.001, 0.01, 0.02, 0.05, 0.1, or 0.15), relative to a corresponding thermoset composition without the functionalized omniphobic polymer.

In a refinement, the composition has a composite structure comprising: (i) a solid matrix comprising the first backbone segments and the third backbone segments; and (ii) liquid nanodomains comprising the second backbone segments; the liquid nanodomains have a size of 80 nm or less (e.g., average size, such as 80 nm or 50 nm or less; size ranging from 1 nm to 40 nm); and the liquid nanodomains are (i) distributed throughout the solid matrix or (ii) substantially only occupy a thin surface layer (e.g., 5, 10, 15, or 20 nm thick; top or exposed layer when applied to a substrate).

In another aspect, the disclosure relates to a coated article comprising: (a) a substrate; and (b) a thermoset omniphobic composition according to any of the variously disclosed embodiments, coated on a surface of the substrate.

Various refinements of the disclosed coated article are possible.

In a refinement, the substrate is selected from the group of metal, plastics, a different thermoset material, glass, wood, fabric (or textile), and ceramics. The substrate is not particularly limited, and generally can be formed from any material desired for protection with an omniphobic coating, in particular given the good, broad adhesive capabilities of the thermoset omniphobic composition. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, another primer coating, etc.), and the thermoset omniphobic composition on the one or more intermediate coatings as the final, external coating on the coated article.

In a refinement, the thermoset omniphobic composition has a thickness ranging from 0.01 µm to 500 µm. More generally, the thermoset omniphobic coating can have any desired thickness on the substrate. In common applications, the coating has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate to form even thicker layers of the composition 100 (e.g., above 500 µm or otherwise) if desired.

In a refinement, the thermoset omniphobic composition coating is scratch-resistant, ink-resistant, and optically clear. For example, the coating can have a scratch resistance value of 7-10, 8-10, 9-10, or 10 as evaluated by the "Scratch Resistance" method described below. Similarly, the coating can have an ink resistance value of 7-10, 8-10, 9-10, or 10 as evaluated by the "Permanent Ink Resistance" method described below.

In another aspect, the disclosure relates to a method for forming a thermoset omniphobic composition, the method comprising: (a) reacting (i) at least one first thermosetting component comprising a first functional group reactive with a second thermosetting component comprising a second functional group and a functionalized omniphobic polymer comprising a third functional group and having a glass transition temperature ($T_g$) of 70° C. or 50° C. or less, (ii) at least one functionalized omniphobic polymer comprising the third functional group and having a glass transition temperature ($T_g$) of 70° C. or 50° C. or less, and (iii) at least one second thermosetting component comprising the second functional group, to form a partially crosslinked reaction product; and (b) curing the partially crosslinked reaction product to form the thermoset omniphobic composition (e.g., as described above and/or according to any of the variously disclosed embodiments). The first functional group, the second functional group, and the third functional group are different from each other. In an embodiment, the first and third functional groups have a higher reaction rate with each other relative to the first and second functional groups with each other.

Various refinements of the disclosed method are possible.

In a refinement, the method comprises reacting the at least one first thermosetting component, the at least one functionalized omniphobic polymer, and the at least one second thermosetting component to form the partially crosslinked reaction product (i) at a temperature from 20° C. to 150° C. (e.g., 20° C., 40° C., or 60° C. to 30° C., 40° C., 60° C., 80° C., 100° C., or 150° C.) and (ii) for a time from 1 min to 300 min (e.g., 1, 2, 5, or 10 min to 20, 40, 60, 120, or 300 min). The reaction can be performed with or without heating the reaction mixture. Room-temperature (e.g., 20° C. to 30° C.) reactions are possible with longer reaction times and/or the addition of a catalyst.

In a refinement, the method comprises mixing while reacting the at least one first thermosetting component, the at least one functionalized omniphobic polymer, and the at least one second thermosetting component to form the partially crosslinked reaction product.

In a refinement, the method comprises while reacting the at least one first thermosetting component, the at least one functionalized omniphobic polymer, and the at least one second thermosetting component to form the partially crosslinked reaction product: reacting the at least one polyisocyanate and the at least one amine-functional omniphobic polymer in the absence of the at least one polyol to form an initial reaction product; and; reacting the at least one polyol with the initial reaction product to form partially crosslinked reaction product. It is generally desirable to mix/react the first thermosetting component and the functionalized omniphobic polymer first (and separately from) the second thermosetting component to further improve and provide a more even distribution of the functionalized omniphobic polymer on the first thermosetting component. However, because of the different relative reaction rates between the first/third vs. first/second functional groups, the monomers more generally can be mixed in any order or combined all at once.

In a refinement, curing the partially crosslinked reaction product to form the thermoset omniphobic composite composition comprises: adding a casting solvent to the partially crosslinked reaction product; applying the casting solvent and the partially crosslinked reaction product to a substrate; drying the substrate to remove the casting solvent, thereby forming a coating of the partially crosslinked reaction product on the substrate; and curing the coating of the partially crosslinked reaction product on the substrate, thereby forming a coating of the thermoset omniphobic composite composition on the substrate. In a further refinement, the method further comprises performing one or more of spraying, casting, rolling, and dipping to apply the casting solvent and the partially crosslinked reaction product to the substrate.

In a refinement, curing the partially crosslinked reaction product to form the thermoset omniphobic composite composition comprises: applying the partially crosslinked reaction product to a substrate; drying the substrate, thereby forming a coating of the partially crosslinked reaction product on the substrate; and curing the coating of the partially crosslinked reaction product on the substrate, thereby forming a coating of the thermoset omniphobic composite composition on the substrate. In a further refinement, the method further comprises performing one or more of spraying, casting, rolling, and dipping to apply the partially crosslinked reaction product to the substrate.

While the disclosed methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to a thermoset omniphobic composition (such as an omniphobic polyurethane or epoxy composition) which includes a thermoset polymer with first, second, and third backbone segments. The first, second, and third backbone segments can correspond to urethane or urea reaction products of polyisocyanate(s), amine-functional omniphobic polymer(s), and polyol(s), respectively, for omniphobic polyurethanes. Similarly, the first, second, and third backbone segments can correspond to urea or beta-hydroxy amine reaction products of polyamine(s), isocyanate-functional omniphobic polymer(s), and polyepoxide(s), respectively, for omniphobic epoxies. The thermoset omniphobic composition has favorable omniphobic properties, for example as characterized by water and/or oil contact and/or sliding angles. The thermoset omniphobic composition further has favorable barrier properties, for example with respect to water vapor and oxygen transmission as well as water absorption. The thermoset omniphobic composition can be used as a coating on any of a variety of substrates to provide omniphobic properties to a surface of the substrate. Such omniphobic coatings can be scratch resistant, ink/paint resistant, and optically clear. The thermoset omniphobic composition can be applied by different coating methods including cast, spin, roll, spray and dip coating methods.

The disclosed composition includes a polymer which can be used as a coating with the ability to bind to metal, glass, wood, fabrics, and ceramics with relative ease, in particular due to the strong adhesive properties of its thermoset constituents (e.g., such as for polyurethane or epoxy thermoset constituents). The polymer coating has an omniphobic quality, repelling water, oils, inks, and spray paints, thus allowing for a coating that not only has typical hydrophobic and oleophobic properties, but also protects a surface from pen inks and various paints. The final polymer product is optically clear (even for relatively thick coatings), making it an ideal choice for coating computer and phone screens as well as windows. The polymer can be manufactured without fluorine as a component and/or as a one-pot reaction process, thus reducing the overall cost when compared to products currently manufactured. Coatings formed from the polymer composition are durable due to the final crosslinked thermoset matrix. The composition can be used in water-repellent, oil-repellent, anti-fingerprint, anti-smudge, and/or anti-graffiti coatings or paints.

Omniphobic Composition

Figure 3:
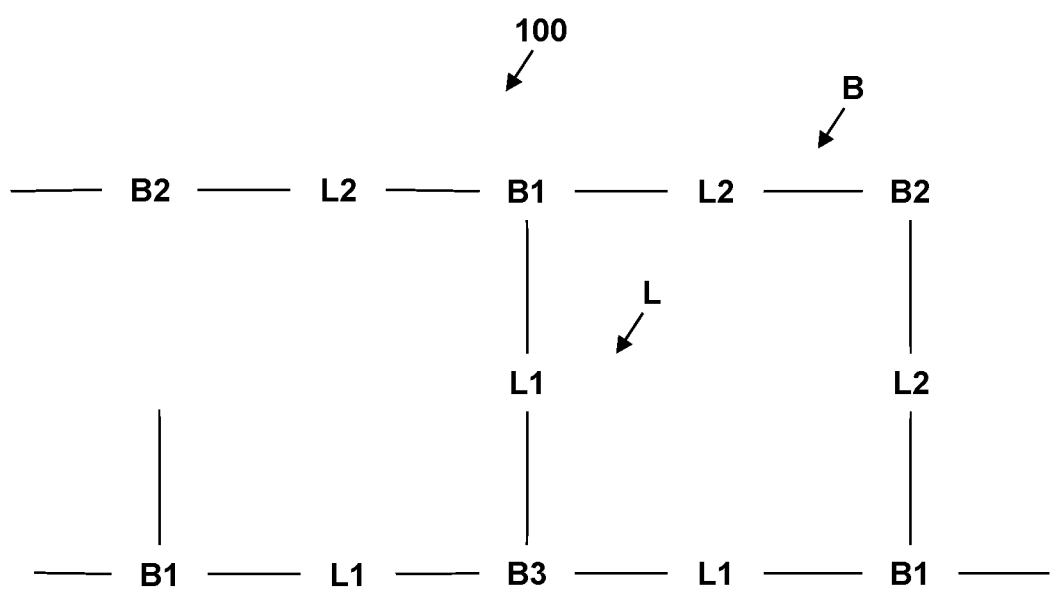
FIG. 3 illustrates a thermoset omniphobic composition according to the disclosure.

FIG. 3 illustrates a thermoset omniphobic composition according to the disclosure. FIG. 3 qualitatively illustrates various backbone segments (B) and linking groups (L) in a crosslinked thermoset polymer 100. The thermoset polymer 100 includes a crosslinked backbone B, which in turn includes (i) first backbone segments B1, (ii) second backbone segments B2, (iii) third backbone segments B3, (iv) first linking groups L1 (e.g., urethane (or carbamate), beta-hydroxy amino) linking first backbone segments and third backbone segments, and (v) second linking groups L2 (e.g., urea) linking first backbone segments and second backbone segments.

As described in more detail below, in embodiments corresponding to a thermoset polyurethane composition, the first backbone segments B1 can result from a polyisocyanate (e.g., monomer, oligomer, or polymer), the second backbone segments B2 can result from a polysiloxane or other omniphobic polymer, and the third backbone segments B3 can result from a polyol (e.g., monomer, oligomer, or polymer). The first linking groups L1 can include urethane (or carbamate) groups and be represented by the general structure —$NR_1$—C(=O)O—, where $R_1$ can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_1$ groups (such as when multiple different reactive components are used). The second linking groups L2 can include urea groups and can be represented by the general structure —$NR_2$—C(=O)—$NR_3$—, where $R_2$ and $R_3$ independently can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_2$ and/or $R_3$ groups (such as when multiple different reactive components are used).

As similarly described in more detail below, in embodiments corresponding to a thermoset epoxy composition, the first backbone segments B1 can result from an amine (e.g., mono- or poly-amine; monomer, oligomer, or polymer), the second backbone segments B2 can result from a polysiloxane or other omniphobic polymer, and the third backbone segments B3 can result from a polyisocyanate (e.g., monomer, oligomer, or polymer). The first linking groups L1 can include beta-hydroxy (tertiary) amine groups and be represented by the general structure —CH(OH)—$CH_2$—$NR_1R_2$, where $R_1$ and $R_2$ independently can be another beta-hydroxy group or the remainder of the amine thermosetting component. The second linking groups L2 can include urea groups and can be represented by the general structure —$NR_2$—C(=O)—$NR_3$—, where $R_2$ and $R_3$ independently can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_2$ and/or $R_3$ groups (such as when multiple different reactive components are used).

The first backbone segments B1 generally have a structure corresponding to a (polymerization) reaction product from at least one first thermosetting component after it has reacted with at least one of a second thermosetting component and a functionalized omniphobic polymer having a glass transition temperature ($T_g$) of 70° C. or 50° C. or less (described below). The first backbone segments B1 can result from a single first thermosetting component species or a blend of two or more different first thermosetting component species with the same or different degree of functionality, but each being able to react with the second thermosetting component and the functionalized omniphobic polymer. For example, in embodiments corresponding to a thermoset polyurethane composition, the first backbone segments B1 can have a structure corresponding to at least one of a urethane reaction product and a urea reaction product from at least one polyisocyanate (e.g., diisocyanate, triisocyanate, or higher degree of isocyanate functionality) with a polyol (urethane) or an amine-functional omniphobic polymer (urea). The first backbone segments B1 can result from a single polyisocyanate (e.g., a diisocyanate, a triisocyanate) species or a blend of two or more different polyisocyanate species with the same or different degree of isocyanate functionality. Similarly, in embodiments corresponding to a thermoset epoxy composition, the first backbone segments B1 can have a structure corresponding to at least one of a beta-hydroxy (tertiary) amine product and a urea reaction product from at least one amine (e.g., monoamine, diamine, triamine, or higher degree of isocyanate functionality) with a epoxide (beta-hydroxy amine) or an isocyanate-functional omniphobic polymer (urea). The first backbone segments B1 can result from a single amine (e.g., monoamine, diamine, triamine) species or a blend of two or more different amine species with the same or different degree of amine functionality.

The second backbone segments B2 generally have a structure corresponding to a (polymerization) reaction product from at least one functionalized omniphobic polymer having a glass transition temperature ($T_g$) of 70° C. or 50° C. or less after it has reacted with the first thermosetting component. The functionalized omniphobic polymer includes a functional group reactive with the first thermosetting component (e.g., amino group, isocyanate group, hydroxyl group, carboxylic group). For example, in embodiments corresponding to a thermoset polyurethane composition, the second backbone segments B2 can have a structure corresponding to a urea reaction product from at least one amine-functional omniphobic polymer having a glass transition temperature ($T_g$) of 70° C. or 50° C. or less (e.g., monoamine-functional, diamine-functional, or higher degree of amine functionality) and a polyisocyanate. Similarly, in embodiments corresponding to a thermoset epoxy composition, the second backbone segments B2 can have a structure corresponding to a beta-hydroxy (tertiary) amine reaction product from at least one isocyanate-functional omniphobic polymer having a glass transition temperature ($T_g$) of 70° C. or 50° C. or less (e.g., mono isocyanate-functional, diisocyanate-functional, or higher degree of isocyanate functionality) and an amine (e.g., monoamine, diamine, triamine). In various embodiments, the functionalized omniphobic polymer has a glass transition temperature in a range from −150° C. to 70° C. or 50° C. (e.g., at least −150° C., −120° C., −100° C., or −50° C. and/or up to −10° C., 0° C., 10° C., 20° C., 30° C., 40° C., 50° C., 60° C., or 70° C.). The functionalized omniphobic polymer can be either in a liquid or a rubbery state at common use temperatures of the final coating, for example in a range from 10° C. to 40° C. or 20° C. to 30° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature ($T_m$) below 10° C. or 20° C.). The functional groups (e.g., amino, isocyanate, hydroxyl, carboxylic) can be terminal and/or pendant from the omniphobic polymer. In an embodiment, the functional groups are terminal groups on a omniphobic polymer (e.g., linear omniphobic polymer with one or two terminal functional groups). The second backbone segments B2 can result from a single functionalized omniphobic polymer species or a blend of two or more different functionalized omniphobic polymer species with the same or different degree of functionality. The functionalized omniphobic polymer can generally include one or more of functionalized polysiloxanes, functionalized polyperfluoroethers, functionalized polybutadienes, functionalized poly(ethylene glycol) methyl ether ("PEO"), functionalized polyisobutylene ("PIB"), functionalized branched polyolefins, functionalized low molecular weight polyolefins, functionalized polyacrylates and polymethacrylates (e.g., also including $C_2$-$C_{16}$ pendant alkyl groups), and any other omniphobic polymer with a glass transition temperature of 70° C. or 50° C. or less. In an embodiment, the functionalized omniphobic polymer, the second backbone segments B2, and/or the corresponding omniphobic composition can be free from fluorine or fluorinated components (e.g., not using functionalized polyperfluoroethers or other fluorine-containing components during synthesis).

The third backbone segments B3 generally have a structure corresponding to a (polymerization) reaction product from at least one second thermosetting component after it has reacted with the first thermosetting component. The third backbone segments B3 can result from a single second thermosetting component species or a blend of two or more different second thermosetting component species with the same or different degree of functionality, but each being able to react with the first thermosetting component. For example, in embodiments corresponding to a thermoset polyurethane composition, the third backbone segments B3 can have a structure corresponding to a urethane reaction product from at least one polyol (e.g., diol, triol, or higher degree of hydroxyl functionality) and a polyisocyanate. The third backbone segments B3 can result from a single polyol species or a blend of two or more different polyol species with the same or different degree of hydroxyl functionality. Similarly, in embodiments corresponding to a thermoset epoxy composition, the third backbone segments B3 can have a structure corresponding to a beta-hydroxy (tertiary) amine product from at least one amine (e.g., monoamine, diamine, triamine, or higher degree of isocyanate functionality) with a epoxide (beta-hydroxy amine). The third backbone segments B3 can result from a single epoxide species or a blend of two or more different amine epoxide with the same or different degree of epoxide functionality.

The first linking groups L1 have a structure corresponding to a reaction product of a first functional group of the first thermosetting component and a second functional group of the second thermosetting component. The second linking groups L2 have a structure corresponding to a reaction product of the first functional group of the first thermosetting component and a third functional group of the functionalized omniphobic polymer. The first, second, and third functional groups generally can be selected from isocyanate, hydroxy, amino, epoxide, and carboxylic groups. In certain embodiments, the first functional group, the second functional group, and the third functional group are different from each other, (e.g., isocyanate, hydroxy, and amino, respectively, for thermoset polyurethane with an amino-functional omniphobic polymer; amino, isocyanate, and epoxide, respectively for a thermoset epoxy with an isocyanate-functional omniphobic polymer). For example, in embodiments corresponding to a thermoset polyurethane composition, The first linking groups L1 can have a structure corresponding to a urethane reaction product of a polyisocyanate as the first thermosetting component (i.e., with an isocyanate group as the first functional group) and a polyol as the second thermosetting component (i.e., with a hydroxyl group as the second functional group), and the second linking groups L2 can have a structure corresponding to a urea reaction product of the polyisocyanate as the first thermosetting component and an amine-functional omniphobic polymer as the functionalized omniphobic polymer (i.e., with an amino group as the third functional group). Similarly, in embodiments corresponding to a thermoset epoxy composition, The first linking groups L1 can have a structure corresponding to a beta-hydroxy amine reaction product of an amine as the first thermosetting component (i.e., with an amino group as the first functional group) and a polyepoxide as the second thermosetting component (i.e., with an epoxide group as the second functional group), and the second linking groups L2 can have a structure corresponding to a urea reaction product of the amine as the first thermosetting component and an isocyanate-functional omniphobic polymer as the functionalized omniphobic polymer (i.e., with an isocyanate group as the third functional group).

In some embodiments, the first and third functional groups have a higher reaction rate with each other relative to the first and second functional groups with each other, for example under the same reaction (e.g., drying, heating, and/or curing) conditions. In some embodiments, the second and third functional groups are generally non-reactive. As an illustration and in the context of the representative thermoset polyurethane and thermoset epoxy compositions according the disclosure, the reaction between isocyanate and amino groups is relatively fast, in particular in comparison to a corresponding reaction between isocyanate and hydroxyl groups and a corresponding reaction between amino and epoxide groups. Thus, for a thermoset polyurethane composition, the isocyanate and amino groups (fast reaction) can correspond to the first and third functional groups, respectively, while the isocyanate and hydroxyl groups (slow reaction) can correspond to the first and second functional groups, respectively. Likewise, for a thermoset epoxy composition, the amino and isocyanate groups (fast reaction) can correspond to the first and third functional groups, respectively, while the amino and epoxide groups (slow reaction) can correspond to the first and second functional groups, respectively.

The polyisocyanate is not particularly limited and generally can include any aromatic, alicyclic, and/or aliphatic isocyanates having at least two reactive isocyanate groups (—NCO). Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

The functionalized omniphobic polymer is not particularly limited and generally can include any omniphobic polymer with glass transition temperature of 70° C. or 50° C. or less, such as in a range from −150° C. to 70° C. or 50° C. The functional group of the functionalized omniphobic polymer can include one or more epoxide groups, amino groups, hydroxyl groups, and carboxylic groups (e.g., including only one type of functional group). Examples of general classes of functionalized omniphobic polymers include functionalized polysiloxanes, functionalized polyperfluoroethers, functionalized polybutadienes, functionalized polyolefins (e.g., polyethylene, polypropylene, polybutylene), and combinations or mixtures thereof. The functionalized polyperfluoroether (e.g., functionalized polyperfluoropolyethers) can include mono-, di-, or higher functionalized polyperfluoroethers, or a blend of thereof, such as a blend of mono- and di-functional polyperfluorothers. The functionalized polybutadiene can include mono-, di-, or higher functional polybutadienes, or a blend of thereof, such as a blend mono- and di-functional polybutadienes. Many suitable functionalized omniphobic polymers are commercially available (e.g., amine-, isocyanate-, or other functional polydimethylsiloxane (PDMS) with a variety of available degrees of functionality and molecular weights). Omniphobic polymers that are not commercially available in their functionalized form can be functionalized using conventional chemical synthesis techniques, for example including but not limited to hydroamination, thiolene Michael reaction of amine-carrying thiols, Mitsunobu reaction, and reductive amination.

The functionalized polysiloxane is not particularly limited and generally can include any polysiloxane having mono-, di-, or higher degrees functionality. In some embodiments, the functionalized polysiloxane includes a mono-functional polysiloxane. In some embodiments, the functionalized polysiloxane includes a di-functional polysiloxane. The polysiloxane can be a polydialklylsiloxane having —Si($R_1R_2$)—O— repeat units, where $R_1$ and $R_2$ independently can be $C_1$-$C_{12}$ linear or branched alkyl groups, $C_4$-$C_{12}$ cycloalkyl groups, unsubstituted aromatic groups, or substituted aromatic groups, in particular where $R_1$ and $R_2$ are methyl groups for a polydimethylsiloxane (PDMS). The functional groups are suitably terminal groups. For example, in an amine-functional polydialklylsiloxane, the structure and terminal groups can be represented by $NH_2$—$R_3$—[Si($R_1R_2$)—O]$_x$—$R_3$—$NH_2$ for a diamine or $NH_2$—$R_3$—[Si($R_1R_2$)—O]$_x$—$R_3$ for a monoamine, where $R_3$ independently can be H (when a terminal group) or $C_1$-$C_{12}$ linear or branched alkyl (when a terminal group or a linker for a terminal amine). The functional groups additionally can be pendant groups, for example in a amine-functional polydialklylsiloxane represented by $R_3$—[Si($R_1R_2$)—O]$_x$[Si($R_{1'}R_{2'}$)—O]$_y$$R_3$, where and $R_2$ independently can be the same as $R_1$ and $R_2$, but at least one or both of $R_{1'}$ and $R_{2'}$ independently is a $C_1$-$C_{12}$ linear or branched alkyl linker group with a terminal amine group (e.g., —$NH_2$). Illustrative isocyanate-functional polydialklylsiloxanes can be represented by the foregoing structures with isocyanate groups (—NCO) replacing the amino groups (—$NH_2$). Some examples of functionalized polysiloxanes include functionalized polydimethylsiloxane, functionalized polymethylphenylsiloxane, and functionalized polydiphenylsiloxane.

Some examples of polyperfluoropolyethers with functional group(s) include functionalized poly(n-hexafluoropropylene oxide) (e.g., —($CF_2CF_2CF_2O$)n-)$NH_2$ or —($CF_2CF_2CF_2O$)n-)NCO for amino or isocyanate groups) and functionalized poly(hexafluoroisopropylene oxide) (e.g., —(CF($CF_3$)$CF_2O$)n$NH_2$ or PFPO—$NH_2$; —(CF($CF_3$)$CF_2O$)nNCO or PFPO—NCO). Some examples of functionalized atactic polyolefins include functionalized poly(l-butene), branched polyethylene, poly(cis-isoprene), poly(trans-isoprene), and poly (1-octene). Some examples of functionalized polyacrylates include poly(3-functionalized propyl acrylate). Similarly, mono-functional polymers include mono-functional polyisobutylene (e.g., PIB-$NH_2$; PIB-NCO), mono-functional polypolyethylene glycol (e.g., PEG-$NH_2$, PEG-NCO), mono-functional poly(l-butene) (e.g., PB-$NH_2$, PB-NCO, cis and trans) can also be used as the low-glass transition temperature ($T_g$ less than 70° C. or 50° C.) polymers, either alone or in combination with other functionalized omniphobic polymers.

The functionalized omniphobic polymers can have any suitable molecular weight in view of desired glass transition temperature, for example having a molecular weight ranging from 300 to 50,000 g/mol. In various embodiments, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Alternatively or additionally, the functionalized omniphobic polymer can have a number of repeat units ranging from 4 to 600 (e.g., at least 4, 10, 12, 15, 20, or 25 and/or up to 12, 15, 20, 30, 40, 60, 200, or 600; such as a (number) average number of repeat units). Some embodiments can include a blend of two or more amine-functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functional polysiloxane can provide better water and oil repellency than a di-functional polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

The polyol is not particularly limited and generally can include any aromatic, alicyclic, and/or aliphatic polyols with at least two reactive hydroxyl/alcohol groups (—OH). Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols (e.g., polypropylene oxide-based triols such as commercially available MULTRANOL 4011 with a MW of about 300), triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)

acrylic polyols (e.g., having random, block, and/or alternating hydroxyl functionalities along with other (meth) acrylic moieties), and isosorbide. The polyol can be biobased or made of synthetic feedstock.

The polyepoxide is not particularly limited and generally can include polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylmethyl] adipate (BECHMA), poly(glycidyl methacrylate), epoxies of rosin acid, epoxies of diphenolic acid, epoxies of tannin acid, epoxies derived from glucose, isosorbide epoxies, eugenol epoxies, furan epoxies, cathechin epoxies, vanillin-based epoxies, quercetin epoxies, epoxies derived from gallic acid, epoxies from phenols, epoxides from cardanols, epoxides from plant oils, terpene oxides (e.g., limonene dioxide), and combinations thereof.

The amine is not particularly limited and generally can include polyamine-substituted aromatic hydrocarbons, aliphatic hydrocarbons, cycloaliphatic hydrocarbons, ethers thereof, esters thereof, imines thereof, and combinations thereof. The amine can include hydrocarbons with two or more amino groups and one or more aromatic, aliphatic, cycloaliphatic, ether, ester, and/or imine groups in the hydrocarbon to which the amino groups are attached. Suitable amines can be derived either petrochemicals or plant materials. Some examples include, but are not limited to, isophorone diamine, diaminopropyl isosorbide, furfuryldiamine, polylysine, menthane diamine, tris (dimethylaminomethyl)phenol, melamine, bis(3-aminopropyl)amine, N,N'-bis(3-aminopropyl)-1,3-propanediamine, 3,3'-diamino-N-methyldipropylamine, tris (3-aminopropyl)amine, 1,2-bis(3-aminopropylamino) ethane, diethylenetriamine, polyetheramines (e.g., JEFFAMINE polyetheramines available from Huntsman Chemical). The amines can be primary, secondary or a combination of both.

In some embodiments including a thermoset polyurethane polymer, at least one of the polyisocyanate and the polyol is a tri- or higher functional isocyanate or alcohol/hydroxy compound, respectively, to promote crosslinking of the backbone segments in the final thermoset polyurethane polymer. Alternatively or additionally, in some embodiments, the functionalized omniphobic polymer is a tri- or higher amine-functional compound (e.g., tri-functional amine PDMS) so that the omniphobic polymer can serve as a crosslinker, either alone or in combination with polyisocyanate and/or polyol crosslinkers.

In some embodiments including a thermoset epoxy polymer, at least one polyepoxide has a functionality greater than two or at least one amine has a functionality greater than one promote crosslinking of the backbone segments in the final epoxy polyurethane polymer. Specifically, since a single primary amino group can react with two epoxide groups, either some species with three or more epoxide groups or two or more amino groups (which can form four or more bonds with epoxides) are used for crosslinking. Typically a diepoxide and a diamine are used. Alternatively or additionally, in some embodiments, the functionalized omniphobic polymer is a tri- or higher isocyanate-functional compound (e.g., tri-functional isocyanate PDMS) so that the omniphobic polymer can serve as a crosslinker, either alone or in combination with polyepoxide and/or amine crosslinkers.

The first, second, and third backbone segments can be incorporated into the thermoset polymer in a variety of relative weight amounts. In an embodiment, the first backbone segments are present in an amount ranging from 10 wt. % to 90 wt. % relative to the thermoset polymer (e.g., at least 10, 15, or 20 wt. % and/or up to 30, 40, 50, 60, 70, 80, or 90 wt. %; such as 30 wt. % to 70 wt. %), which amounts can equivalently correspond to the first thermosetting component(s), for example as added to a reaction mixture and relative to all monomeric, oligomeric, and polymeric reaction components added thereto. In an embodiment, the second backbone segments are present in an amount ranging from 0.01 wt. % to 20 wt. % relative to the thermoset polymer (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %), which amounts can equivalently correspond to the functionalized omniphobic polymer(s), for example as added to a reaction mixture and relative to all monomeric, oligomeric, and polymeric reaction components added thereto. In an embodiment, the third backbone segments are present in an amount ranging from 10 wt. % to 90 wt. % relative to the thermoset polymer (e.g., at least 10, 20, 30, 40, or 50 wt. % and/or up to 70, 80, or 90 wt. %, such as 30 wt. % to 70 wt. %), which amounts can equivalently correspond to the first thermosetting component(s), for example as added to a reaction mixture and relative to all monomeric, oligomeric, and polymeric reaction components added thereto.

Similarly, the first, second, and third backbone segments can be incorporated into the thermoset polymer in a variety of relative molar amounts based on the corresponding reactive functional groups of their corresponding monomeric, oligomeric, and polymeric reaction components. Suitably, approximately a 1:1 molar ratio of combined second and third functional groups (e.g., hydroxy and amino groups, respectively; isocyanate and epoxide groups, respectively) relative to first functional groups (e.g., isocyanate groups; amino groups) is used when combining reactive components to make the omniphobic composition. In most cases, first functional groups are added in a slight molar excess. Final molar ratios of (i) first functional groups to (ii) second and third functional groups combined are typically between 1:1 to 1.6:1, for example at least 1:1, 1.1:1, or 1.2:1 and/or up to 1.4:1, 1.5:1, or 1.6:1.

In an embodiment, the thermoset polymer crosslinked backbone can include further types of backbone segments. For example, the backbone can include fourth backbone segments which have a structure corresponding to a reaction product of a mono-functional monomer component having only one first functional group with the second thermosetting component or the functionalized omniphobic polymer. The mono-functional monomer component can be, for example, a monoisocyanate or a monoepoxide, which can be used as a means to control crosslinking degree as well as to incorporate hydrophobic or other functional groups at an external or boundary portion of the thermoset polymer.

Examples of monoisocyanates include R—(N=C=O), where R can include aromatic, alicyclic, and/or aliphatic groups, for example having at least 2, 4, 6, 8, 10 or 12 and/or up to 8, 12, 16, or 20 carbon atoms. The fourth backbone segments can be present in an amount ranging from 0.01 wt. % to 4 wt. % relative to the thermoset polymer (e.g., at least 0.01, 0.1, 0.2, or 0.5 wt. % and/or up to 1, 2, or 4 wt. %), which amounts can equivalently correspond to the monofunctional monomer component, for example as added to a reaction mixture and relative to all monomeric, oligomeric, and polymeric reaction components added thereto.

In an embodiment, the thermoset omniphobic composition can include any suitable organic or inorganic filler or additive, which can be included to improve one or more of mechanical properties, optical properties, electrical properties, and omniphobic properties of the final composition. Examples of suitable fillers or additives include nanoclay, graphene oxide, graphene, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers can be added in the range from 0.01 wt. % to 10 wt. %, for example in range from 1 wt. % to 5 wt. %

The omniphobic properties of the thermoset composition (e.g., for the cured composition) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

Figure 4:
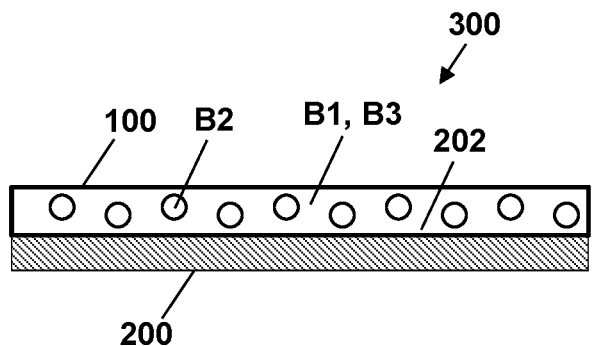
FIG. 4 illustrates a coated article according to the disclosure in which the thermoset omniphobic composition has a composite structure.

The thermoset omniphobic composition generally has a homogeneous structure, for example a homogenous thermoset solid with the first, second, and third backbone segments being generally evenly distributed throughout the composition. This is in contrast to a common "self-stratified" structure with a siloxane (or other hydrophobic or omniphobic polymer group) rich surface and bulk thermoset region with little or no siloxane (or other hydrophobic or omniphobic polymer group). In an embodiment, the thermoset omniphobic composition has a composite structure as illustrated in FIG. 4. The composite structure can include a solid matrix formed primarily from the first backbone segments and the third backbone segments linked together (e.g., with or without some second backbone segments incorporated therein). The composite structure can further include nanodomains distributed throughout the solid matrix. The nanodomains are formed primarily from the second backbone segments (e.g., with or without minor amounts of first and/or third backbone segments incorporated therein), and generally have a size of 80 nm or less, more preferably 50 nm or 40 nm or less. The nanodomains can be liquid nanodomains or rubbery nanodomains, depending on the usage temperature of the omniphobic composition relative to the glass transition and melting temperatures of the functionalized omniphobic polymer precursor to the second backbone segments. For example, the nanodomains can have a size or diameter of at least 0.1, 1, 10, 15 or 20 nm and/or up to 30, 40, 50, or 80 nm; for example 1 nm to 40 nm or 1 nm to 80 nm. The ranges can represent a distribution of sizes for the nanodomains and/or a range for an average nanodomain size (e.g., weight-, number-, or volume-average size). In a lower limit as the size of the nanodomains approaches zero, the composition approaches a homogeneous structure as a homogeneous thermoset solid with the first, second, and third backbone segments being generally evenly distributed throughout the omniphobic composition as illustrated in FIG. 5.

Coated Article

Figure 5:
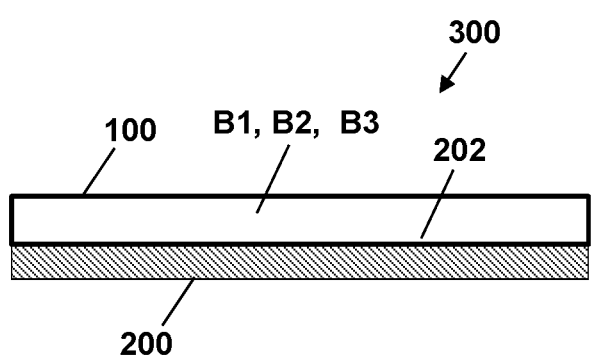
FIG. 5 illustrates a coated article according to the disclosure in which the thermoset omniphobic composition has a homogeneous structure.

FIGS. 4 and 5 illustrate an aspect of the disclosure in which a coated article 300 (e.g., desirably having omniphobic properties on at least one surface thereof) includes a substrate 200 and the thermoset omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the thermoset omniphobic composition 100 provides omniphobic protection to the underlying substrate 200.

The substrate 200 is not particularly limited, and generally can be formed from any material desired for protection with an omniphobic coating, in particular given the good, broad adhesive capabilities of the thermoset omniphobic composition 100. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the thermoset omniphobic composition 100 on the one or more intermediate coatings as the final, external coating on the coated article 300.

The thermoset omniphobic composition 100 can have any desired thickness on the substrate 200. In common applications, the composition 100 has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 μm or 0.10 μm to 0.20 μm or 0.50 μm. Multiple coating layers can be applied to substrate 200 to form even thicker layers of the composition 100 (e.g., above 500 μm or otherwise) if desired.

Method of Making Composition and Coated Article

The thermoset omniphobic composition according to the disclosure generally can be formed by first reacting the first thermosetting component(s), the functionalized omniphobic polymer(s), and the second thermosetting component(s) to form a partially crosslinked (e.g., not fully crosslinked) reaction product, and then curing the partially crosslinked reaction product to form the thermoset omniphobic composition (e.g., after application a substrate to provide an omniphobic coating thereon). The partially crosslinked reaction product contains at least some unreacted first, second, and/or third functional groups for eventual further reaction during curing/full crosslinking. In some embodiments, the partially crosslinked reaction product contain at least some unreacted first and second functional groups, but is free or substantially free of unreacted third functional groups (e.g., where all or substantially all of the third functional groups in the functionalized omniphobic polymer have reacted with a first functional groups, but the first thermosetting component still has at least some free some unreacted first functional groups remaining). The initial, partial crosslinking reaction can be performed in a suitable reaction solvent or medium, for example an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, a reaction catalyst such as salts of tin (e.g., tin(II) 2-ethylhexanoate) or iron, and tertiary amines (e.g., triethylamine) can be used. can be added to catalyze the reaction between the polyisocyanate and the polyol. Curing can be performed by heating (e.g., in an oven, with exposure to a heat lamp, etc.) at a temperature from 80° C. or 100° C. to 140° C. or 180° C. and/or for a time from 1 hr to 24 hr. Lower heating temperature or ambient temperature curing also possible, such as room temperature curing (e.g., 20° C. to 30° C.) for 5-10 days, lower heating (e.g., 30° C. or 40° C. to 60° C. for 2-4 days or 60° C. to 80° C. for 1-3 days).

Reaction to form the partially crosslinked reaction product generally can be performed at any suitable reaction temperature(s) and time(s), which can be selected such that there is sufficient time to partially (but not completely) crosslink/cure the components of the reaction mixture, thus leaving some reactive functional groups for eventual full curing/crosslinking in the final thermoset composition. In an embodiment, reaction to form the partially crosslinked reaction product is performed (i) at temperature from 20° C. or 40° C. to 80° C. or 100° C. and (ii) for a time from 5 min to 300 min. Thus, reaction can be performed with or without heating the reaction mixture. Room-temperature (e.g., 20° C. to 30° C.) reactions are possible with longer reaction times and/or the addition of a catalyst. The initial reaction between the first thermosetting component and the functionalized omniphobic polymer is generally very fast and need not be heated for suitable reaction times. Subsequent reaction between the first thermosetting component and the second thermosetting component is slower and preferably involves heating and/or the use of a catalyst.

In an embodiment, reaction to form the partially crosslinked reaction product includes stirring or otherwise mixing the reaction components to improve reactant homogeneity and that of the eventual product. Mixing or stirring during the reaction between the first thermosetting component and the functionalized omniphobic polymer (e.g., whether the two are reacted/combined separately from or together with the second thermosetting component) is particularly desirable because the first/third functional group reaction is generally very fast, and mixing of the reaction mixture is desirable to help form a distributed partially cured reaction product in which most first thermosetting component molecules have at least one free first functional group for eventual reaction with a second thermosetting component molecule. Put another way, stirring/mixing helps to avoid a situation in which some first thermosetting component molecules have all of their first functional groups reacted with third functional groups from the functionalized omniphobic polymer, which in turn prevents further reaction with a second thermosetting component molecule for incorporation into the crosslinked network of the thermoset polymer and can lead to opaque or hazy films (i.e., instead of desirably transparent films). Accordingly, mixing/stirring combined with appropriate selection of stoichiometric ratios between the first thermosetting component, the functionalized omniphobic polymer, and the second thermosetting component helps to ensure that most, if not all or substantially all, first thermosetting component molecules react with at least one second thermosetting component molecule (e.g., having at least one first linking group L1).

In an embodiment, reaction to form the partially crosslinked reaction product includes first reacting the first thermosetting component and the functionalized omniphobic polymer (e.g., in the absence of the second thermosetting component) to form an initial reaction product. Reaction to form the initial reaction product is preferably performed with mixing or stirring as above to obtain a good distribution of unreacted first thermosetting component molecules and/or partially third functional group-reacted first thermosetting component molecules with at least one first functional group available for further reaction. The initial reaction product suitably contains third functional group-reacted first thermosetting component molecules as well as possibly one or both of unreacted first thermosetting component molecules and unreacted functionalized omniphobic polymers. This step can be performed in a single reaction vessel prior to addition of the at least one second thermosetting component, and is preferably performed in the absence of any reactive second functional group-containing species, whether the second thermosetting component or otherwise. The initial reaction product is then reacted with the second thermosetting component to form partially crosslinked reaction product, for example by adding or otherwise combining the polyol with the initial reaction product between the first thermosetting component and functionalized omniphobic polymer (e.g., in the same reaction vessel, and optionally with heating and/or further catalyst addition). This sequence of addition/reaction is preferable but required. Other sequences of addition or combination of all three reactive components at the same time are possible. In some cases, the resulting thermoset omniphobic composition might have relatively poorer optical properties in terms of being partially opaque or not completely transparent, but the composition generally has the same or comparable omniphobic properties with respect to contact and gliding angles, etc.

In an embodiment, curing the partially crosslinked reaction product includes adding a casting solvent to the partially crosslinked reaction product. Suitably, the casting solvent is one that does not dissolve the functionalized omniphobic polymer, which is a suitable selection whether the final thermoset composition is desired to have an inhomogeneous composite-type structure with nanodomains as described above or a homogeneous structure Examples of suitable casting solvents include dimethyl carbonate, diethyl carbonate, dimethylformamide, dimethylacetamide, acetonitrile, etc. Further, it can be desirable to remove the reaction solvent used for form partially crosslinked reaction product, for example by heating and/or using a gas such as nitrogen (e.g., purging or bubbling the gas through the reaction mixture), so that the partially crosslinked reaction product is in solution in the casting solvent. The casting solvent and the partially crosslinked reaction product are then applied to a substrate, which is subsequently air-dried to remove the casting solvent and form a coating of the partially crosslinked reaction product on the substrate. The dried coating is then cured as described above to form the thermoset omniphobic composition coating on the substrate. In most cases, the cured thermoset remains as a coating on the substrate to provide omniphobic properties to the substrate. In some embodiments, the cured thermoset can be deliberately peeled or otherwise removed from the substrate to provide a standalone composition in the form or a free film or other coating. The coating can be applied using any suitable method, such as by casting, spraying, rolling and/or dipping.

In an embodiment, curing the partially crosslinked reaction product includes applying the partially crosslinked reaction product to a substrate (e.g., applied as dissolved/dispersed in its original reaction medium or reaction solvent, without solvent exchange/addition with a casting solvent). The coated substrate is then dried (e.g., to remove the reaction solvent) to form a coating of the partially crosslinked reaction product on the substrate. The dried coating is then cured as described above to form the thermoset omniphobic composition coating on the substrate.

EXAMPLES

The following examples illustrate the disclosed compositions and methods, but are not intended to limit the scope of any claims thereto. In the following examples, thermoset omniphobic compositions generally according to the disclosure are prepared and applied as a film or coating on a test substrate such as glass. The applied films or coatings can then be evaluated according to a variety of tests as described below in order to characterize their relative degree of omniphobicity.

Figure 1:
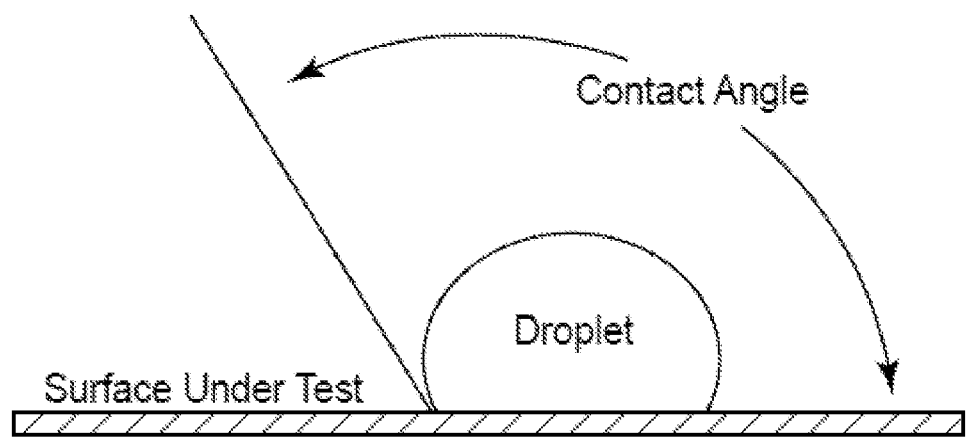
FIG. 1 is a diagram illustrating measurement of a contact angle for a liquid droplet on a surface.
Figure 2:
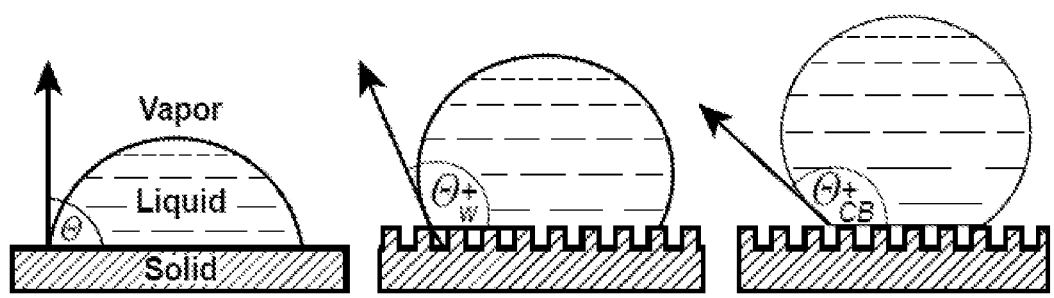
FIG. 2 is a diagram illustrating how contact angles for a given liquid droplet on a surface can vary as a function of surface topology (e.g., flat or smooth surface vs. textured surfaces).

Contact Angle:

Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 0° or 1° to 65° (e.g., at least 1°, 10°, 20°, or 30° and/or up to 40°, 50°, 60°, or 65°).

Sliding Angle:

Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Scratch Resistance:

Scratch resistance is evaluated on a scale of 1 (worst) to 10 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "10" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Permanent Ink Resistance:

Permanent ink resistance is evaluated on a scale of 1 (worst) to 10 (best) by applying an ink marking on a test coating surface using a permanent ink marker (e.g., SHARPIE permanent ink marker or equivalent) and then attempting to wipe off the marking using a tissue (e.g., KIMWIPE laboratory cleaning tissue or equivalent). The test surface is rated as "1" if all of the ink marking remains on the test coating surface after being wiped. The test surface is rated as "10" if all of the ink marking is removed from the test coating surface after being wiped. These numbers give an estimation of the ink-resistance, which are qualitatively assigned by taking two aspects in consideration: 1) the amount of ink left behind after a single wipe of the sample, and 2) the ink left behind after multiple wipes of the sample.

Barrier Properties:

Films are tested for their barrier properties in terms of measured permeability through the film in units of (amount·length)/(area·time·pressure), where the amount can be expressed in mass or moles (e.g., equivalently in volume, such as for gases). The barrier properties of a film can be characterized by the permeability of the film with respect to any particular chemical species (e.g., environmental gaseous species), but it is typically characterized with respect to water vapor permeability and oxygen gas permeability.

Permeability can be measured using any suitable commercially available instrument for such purpose, for example a MOCON Ox-Tran Model 2/21, MH instrument (for oxygen permeability determination) and a MOCON Model 3/33 instrument (for water permeability determination) (both available from MOCON, Inc., Minneapolis, Minn.). In a representative procedure, test films are masked to set a reference exposure/transmission test area of 3.14 cm$^2$ (although other test areas may be suitable, for example for other instrumentation). Permeability is determined through the test film/test area using a controlled, known temperature relative humidity (RH) of the carrier gas as well as the permeant gas. Representative test conditions include 50% RH and approximately room temperature (e.g., 20-25° C., such as 21° C.). The thickness of the test film can be selected to be any desirable value (e.g., corresponding to typical thicknesses of the film in use), for example in a range of about 0.01 μm to 500 μm or 1000 μm (e.g., 10 μm, 100 μm, or 1000 μm test film thickness).

The thermoset omniphobic compositions according to the disclosure generally have favorable barrier properties to both polar and non-polar gaseous permeants, for example as represented by favorable barrier properties to both water (polar) and oxygen (non-polar) gaseous permeants. The favorable barrier properties of the thermoset omniphobic compositions according to the disclosure can be characterized in terms of a reduction in permeability for a given gaseous permeant, expressed as the permeability of a thermoset omniphobic composition (e.g., test film) according to the disclosure relative to the permeability of a corresponding thermoset composition (e.g., comparative test film) without the functionalized omniphobic polymer component (e.g., with both compositions/films generally having the same other components, component relative amounts, test film thickness). Suitably, a thermoset omniphobic composition according to the disclosure has a relative permeability for a given gaseous permeant of 0.9, 0.8, 0.7, 0.6, 0.5, 0.4, 0.3, 0.25, 0.2, 0.15, 0.1, 0.05, 0.02, 0.01, or 0.001 or less and/or at least 0.001, 0.01, 0.02, 0.05, 0.1, or 0.15, relative to a corresponding thermoset composition without the functionalized omniphobic polymer. The foregoing ranges can apply independently to individual gaseous permeants (e.g., water and oxygen, with different relative permeability values being characteristic of the film for each or water and oxygen). For example, the thermoset omniphobic composition can have a relative permeability for water vapor of 0.9, 0.7, or 0.3 or less, a relative permeability for oxygen of 0.9, 0.7, 0.3 or less, and/or a relative absorption for water vapor of 0.9, 0.7, or 0.3 or less.

Water Vapor Uptake:

Films can be characterized for their resistance to water transmission based on their absorption or uptake of water vapor under controlled conditions. Test films for the thermoset omniphobic composition and any comparative compositions (e.g., a corresponding thermoset composition without the functionalized omniphobic polymer) are cut into three suitably sized samples, for example 50 mm×50 mm (or 2 in×2 in). The initial weights of the samples are noted. The samples are placed in a humidity chamber at a controlled temperature of 37.5° C. and 85% RH for 24 hours. The samples are then removed from the chamber, weighed, and the weight increase or difference is calculated for all samples to represent water uptake.

Example 1—One-Pot Synthesis of Omniphobic Polyurethane 2.2 ml (2.3 g) of poly(hexamethylene diisocyanate) (DESMODUR N 100A; Covestro, primarily including (trifunctional) triisocyanate species) was taken in a 20 ml vial, and was diluted with 2.0 mL tetrahydrofuran (THF). To this solution, 0.05 ml (0.049 g) bis-(3-aminopropyl)-terminated polydimethylsiloxane (denoted as $NH_2$—PDMS-$NH_2$ or PDMS-diamine; ($M_n$=2500 g/mol); Sigma-Aldrich) was diluted with 0.2 ml THF and was added slowly under stirring. Subsequently, 0.68 ml (0.69 g) of polyether polyol (MULTRANOL 4011; ~306 MW g/mol triol; Bayer Chemical Company) was added to the 20 ml vial. The vial was then heated and stirred at 60° C. for 20 minutes. The vial was cooled to room temperature and then 6 ml dimethyl carbonate (DMC) was added to the vial. THF from the solution was removed by bubbling of nitrogen gas (or under reduced pressure). After complete removal of THF, the remaining coating solution in DMC was cast on a 3 inch×1 inch micro glass slide by placing them on a leveled surface. The cast film was air dried for 30 minutes before curing a coating in oven at 100° C. for 6 hours.

The cast film was tested to characterized its relative degree of omniphobicity, and it had the following properties: Water Contact Angle: 102°; Water Sliding Angle: 25° (75 μL droplet); Oil Contact Angle: 55° (Cooking/vegetable on); Oil Sliding Angle: 15° (5 μL droplet); Permanent Ink Resistance: 10 (in a scale of 1-10, where 10 is the best and 1 is the worst) [Appearance: clear transparent; and Scratch Resistance: 10 (in a scale of 1-10, where 10 is excellent).

This example illustrates a one-pot approach according to the disclosure for making an omniphobic coating with several favorable properties such as scratch resistance, permanent ink resistance, good optical clarity, and an anti-graffiti surface. In contrast to Hu et al. U.S. Publication No. 2016/0200937 which uses a two-step/two-pot approach in which a polysiloxane (or other hydrophobic component) is first grafted onto a copolymer with randomly distributed hydrophobic functional groups using toxic chemicals such as oxalyol chloride and phosgene gas, prior chemical modification of the monomer units is not required in the present process, thus providing a structurally distinct polymer product that can be formed in a one-pot process that also avoids the use and separation of the toxic grafting chemical reagents.

Example 2—Synthesis of Omniphobic Polyurethanes with Variable Polyol, Polyisocyanate Components The following examples illustrate omniphobic coatings according to the disclosure using a variety of different polyol and polyisocyanate components.

Example 2.1

20 mg HDI trimer biuret (UH 80; available from Sherwin-Williams) was taken in 20 mL vial and diluted with 2 mL acetone. To this solution, 2.5 mg PDMS-Diamine (dissolved in acetone) was added drop-wise, and the mixture was stirred for 5 minutes. Then to this solution, 58 mg acrylic polyol (C939; available from Sherwin-Williams) was added, and the mixture was stirred at 65° C. for 2 hrs. This solution was cooled and diluted with 2 mL DMC. Using $N_2$ bubbling, acetone was removed and remaining solution was drop casted on a test substrate glass and cured at 120° C. in oven for 6 hrs.

Example 2.2

A coating was formed as in Example 2.1, except that 22 mg UH 80 polyisocyanate and 5 mg PDMS-Diamine were used.

Example 2.3

A coating was formed as in Example 2.1, except that 80 mg UH 80 polyisocyanate and 25 mg PDMS-Diamine were used.

Example 2.4

50 mg HDIT (DESMODUR N 100A, trifunctional HDI trimer with a trifunctional HDI biuret was taken in 20 mL vial and diluted with 3 mL acetone. To this solution, 2.5 mg octyl isocyanate (dissolved in acetone) was added followed by dropwise addition of 5 mg PDMS-Diamine (dissolved in acetone), and the mixture was stirred for 5 minutes. Then to this solution 240 mg polyol (C939) was added, and the mixture was stirred at 65° C. for 2 hrs. This solution was cooled and diluted with 6 mL DMC. Using $N_2$ bubbling, acetone was removed and remaining solution was drop casted on a test substrate glass and cured at 120° C. in oven for 6 hrs. A coating Sample "A" was prepared in which the final solution (1 mL) was diluted in 1 mL DMC and drop casted and cured at 120° C. for 6 hrs. A coating Sample "B" was prepared in which the final solution (1 mL) was diluted in 2 mL DMC and drop casted and cured at 120° C. for 6 hrs.

Example 2.5

A coating was formed as in Example 2.4, except that 5 mg octyl isocyanate was used, and an additional coating Sample "C" was prepared in which the final solution (1 mL) was diluted in 3 mL DMC and drop casted and cured at 120° C. for 6 hrs.

Example 2.6

A coating was formed as in Example 2.4, except that 10 mg octyl isocyanate was used.

Results:

The films according to Examples 2.1-2.3 were very transparent with a very thin film, having a 4-drop (~80 μL) water sliding angle of about 20° and 1-drop oil (~5 μL) sliding angle of about 20°. The films according to Examples 2.4-2.6 were not that much transparent, but they showed good omniphobic properties as compared to Examples 2.1-2.3. Example 2.5 had a 4-drop (~80 μL) water sliding angle of about 20°-25° and 1-drop oil (~5 μL) sliding angle of about 20°-25°. The other samples [examples 2.1-2.4] had a larger drop volume comparable water and oil sliding angles of about 20°-25°. Example 2.4 showed good repellency as compare to other samples with fast sliding at −20°-25° with 1 drop (5 uL) of oil.

Example 3—Synthesis of Omniphobic Polyurethanes with Variable PDMS Components The following examples illustrate omniphobic coatings according to the disclosure using a mono-functional amine PDMS component additionally containing an alkyl (octyl) tail.

Example 3.1

2.2 mL (2.3 g) HDIT (DESMODUR N 100A) was taken in 20 mL vial and diluted with 2 mL THF. To this solution, 0.05 mL (~0.05 g) octyl-PDMS-$NH_2$ ([PDMS type, Mn=2655, prepared by reacting $NH_2$—PDMS-$NH_2$ (Mn=2500 g/mol) with isooctyl isocyanate) was added dropwise, and the mixture was stirred for 5 minutes. Then to this solution, 0.68 mL (0.69 g) polyether polyol (MULTRANOL 4011) was added, and the mixture was stirred at 60° C. for 20 min. This solution was cooled and diluted with 6 mL DMC. Using $N_2$ bubbling, THF was removed and the remaining solution was drop casted on a test substrate glass and cured at 120° C. in oven for 6 hrs.

Example 3.2

A coating was formed as in Example 3.1, except that 2.3 mL (2.4 g) HDIT polyisocyanate and 0.02 mL (~0.02 g) octyl-PDMS-$NH_2$ were used.

Example 3.3

A coating was formed as in Example 3.1, except that 2.4 mL (2.5 g) HDIT polyisocyanate and 0.1 mL (0.1 g) octyl-PDMS-$NH_2$ were used.

Example 3.4

A coating was formed as in Example 3.1, except that 1.10 mL (1.15 g) HDIT polyisocyanate in acetone (i.e., instead of THF) and 50 mg octyl-PDMS-$NH_2$ in acetone were used. Further, a coating Sample "A" was prepared in which the final solution (1 mL) was diluted in 1 mL DMC and drop casted and cured at 120° C. for 6 hrs, a coating Sample "B" was prepared in which the final solution (1 mL) was diluted in 2 mL DMC and drop casted and cured at 120° C. for 6 hrs, and a coating Sample "C" was prepared in which the final solution (1 mL) was diluted in 3 mL DMC and drop casted and cured at 120° C. for 6 hrs.

Example 3.5

A coating was formed as in Example 3.4, 2.3 mL (2.6 g) HDIT polyisocyanate in acetone, 100 mg octyl-PDMS-$NH_2$ in acetone, and 1.4 mL (1.4 g) MULTRANOL 4011 polyol were used.

Results:

The sample coatings were transparent, showing slightly milky appearance at aggregated coatings areas. Example 3.1 show omniphobic properties with a 6-7 drop (120-140 μL) water sliding angle of about 30°-35° and a 2-3 drop (10-15 μL) oil sliding angle of about 30°-35°. Other samples showed 10-12 drops (200-220 μL) water sliding angles of about 30°-35°, while oil repellency was about the same with a 2-3 drop (15-20 μL) oil sliding angle of about 30°-35°.

Example 4—Synthesis of Omniphobic Polyurethanes with Variable PDMS Components The following examples illustrate omniphobic coatings according to the disclosure using a mono-functional amine PDMS component with no further functionalization (e.g., no alkyl (octyl) tail as in Example 3).

Example 4.1

1.1 mL (1.15 g) HDIT (DESMODUR N 100A) was taken in 20 mL vial and diluted with 2 mL acetone. To this solution, 1.2 mg PDMS-$NH_2$ dissolved in acetone (MW 1000 average, MONOAMINOPROPYL TERMINATED POLYDIMETHYLSILOXANE, asymmetric, 8-12 cst, GELEST) was added dropwise, and the mixture was stirred for 5 minutes. Then to this solution, 0.70 mL (0.71 g) polyether polyol (MULTRANOL 4011) was added, and the mixture was stirred at 60° C. for 1 hr. This solution was cooled and diluted with 6 mL DMC. Using $N_2$ bubbling, acetone was removed and the remaining solution was drop casted on a test substrate glass and cured at 120° C. in oven for 6 hrs.

Example 4.2

A coating was formed as in Example 4.1, except that 1.15 mL (1.20 g)
HDIT polyisocyanate and 6 mg PDMS-$NH_2$ were used.

Example 4.3

A coating was formed as in Example 4.1, except that 1.15 mL (1.20 g) HDIT polyisocyanate and 12 mg PDMS-$NH_2$ were used.

Example 4.4

A coating was formed as in Example 4.1, except that 1.25 mL (1.30 g) HDIT polyisocyanate and 24 mg PDMS-$NH_2$ were used.

Example 4.5

A coating was formed as in Example 4.1, except that 1.45 mL (1.51 g) HDIT polyisocyanate and 48 mg PDMS-$NH_2$ were used.

Example 5—Synthesis of Omniphobic Polyurethanes with Variable PDMS Components

The following examples illustrate omniphobic coatings according to the disclosure using a mono-functional amine PDMS component with no further functionalization, similar to Example 4 but with a higher molecular weight PDMS component.

Example 5.1

1.1 mL (1.15 g) HDIT (DESMODUR N 100A) was taken in 20 mL vial and diluted with 2 mL acetone. To this solution, 2 mg PDMS-$NH_2$ dissolved in acetone (MW 2000 average) (MONOAMINOPROPYL TERMINATED POLYDIMETHYLSILOXANE, asymmetric, 18-25 cSt, GELEST) was added dropwise, and the mixture was stirred for 5 minutes. Then to this solution, 0.7 mL (0.71 g) polyether polyol (MULTRANOL 4011) was added, and the mixture was stirred at 60° C. for 1 hr. This solution was cooled and diluted with 6 mL DMC. Using $N_2$ bubbling, acetone was removed and the remaining solution was drop casted on a test substrate glass and cured at 120° C. in oven for 6 hrs.

Example 5.2

A coating was formed as in Example 5.1, except that 1.15 mL (1.20 g) HDIT polyisocyanate and 10 mg PDMS-$NH_2$ were used.

Example 5.3

A coating was formed as in Example 5.1, except that 1.15 mL (1.20 g) HDIT polyisocyanate and 20 mg PDMS-$NH_2$ were used.

Example 5.4

A coating was formed as in Example 5.1, except that 1.25 mL (1.30 g) HDIT polyisocyanate and 40 mg PDMS-$NH_2$ were used.

Example 5.5

A coating was formed as in Example 5.1, except that 1.45 mL (1.51 g) HDIT polyisocyanate and 80 mg PDMS-$NH_2$ were used.

Example 6—Synthesis of Omniphobic Polyurethanes with PDMS Component Blends

The following examples illustrate omniphobic coatings according to the disclosure using a blend of mono-functional amine PDMS components with no further functionalization at different ratios.

Example 6.1

1.1 mL (1.15 g) HDIT (DESMODUR N 100A) was taken in 20 mL vial and diluted with 1 mL acetone and vortexed for less than 1 minute. To this solution, 1.2 mg PDMS-$NH_2$ (1K) dissolved in acetone (MW 1000 average) followed by 2 mg PDMS-$NH_2$ (2K) dissolved in acetone (MW 2000 average) were added dropwise, and the mixture was stirred for 5 minutes. Then to this solution, 0.7 mL (0.71 g) polyether polyol (MULTRANOL 4011) was added, and the mixture was stirred at 60° C. for 1 hr. This solution was cooled and diluted with 6 mL DMC. Using $N_2$ bubbling, acetone was removed and the remaining solution was drop casted on a test substrate glass and cured at 120° C. in oven for 6 hrs.

Example 6.2

A coating was formed as in Example 6.1, except that 6 mg PDMS-$NH_2$ (1K) was used.

Example 6.3

A coating was formed as in Example 6.1, except that 1.2 mL (1.25 g) HDIT polyisocyanate and 12 mg PDMS-$NH_2$ (1K) were used.

Example 6.4

A coating was formed as in Example 6.1, except that 1.2 mL (1.25 g) HDIT polyisocyanate and 24 mg PDMS-$NH_2$ (1K) were used.

Example 6.5

A coating was formed as in Example 6.1, except that 1.25 mL (1.03 g) HDIT polyisocyanate and 48 mg PDMS-$NH_2$ (1K) were used.

Example 6.6

A coating was formed as in Example 6.1, except that 1.2 mL (1.25 g) HDIT polyisocyanate and 80 mg PDMS-NH$_2$ (1K) were used.

Example 6.7

A coating was formed as in Example 6.1, except that the PDMS-NH$_2$ (2K) component was added before the PDMS-NH$_2$ (1K) component.

Example 6.8

A coating was formed as in Example 6.7, except that 10 mg PDMS-NH$_2$ (2K) was used.

Example 6.9

A coating was formed as in Example 6.7, except that 1.2 mL (1.25 g) HDIT polyisocyanate and 20 mg PDMS-NH$_2$ (2K) were used.

Example 6.10

A coating was formed as in Example 6.7, except that 1.2 mL (1.25 g) HDIT polyisocyanate and 40 mg PDMS-NH$_2$ (2K) were used.

Example 6.11

A coating was formed as in Example 6.7, except that 1.25 mL (1.30 g) HDIT polyisocyanate and 80 mg PDMS-NH$_2$ (2K) were used.

Example 7—Synthesis of Omniphobic Polyurethanes with PDMS Component Blends

The following examples illustrate omniphobic coatings according to the disclosure using a blend of mono-functional amine PDMS components with no further functionalization at different PDMS concentrations.

Example 7.1

1.1 mL (1.15 g) HDIT (DESMODUR N 100A) was taken in 20 mL vial and diluted with 1 mL acetone and vortexed for less than 1 minute. To this solution, 10 mg PDMS-NH$_2$ (2K) dissolved in acetone (MW 2000 average) followed by 6 mg PDMS-NH$_2$ (1K) dissolved in acetone (MW 1000 average) were added dropwise, and the mixture was stirred for 5 minutes. Then to this solution, 0.7 mL (0.71 g) polyether polyol (MULTRANOL 4011) was added, and the mixture was stirred at 60° C. for 1 hr. This solution was cooled and diluted with 6 mL DMC. Using N$_2$ bubbling, acetone was removed and the remaining solution was drop casted on a test substrate glass and cured at 120° C. in oven for 6 hrs.

Example 7.2

A coating was formed as in Example 7.1, except that 20 mg PDMS-NH$_2$ (2K) and 12 mg PDMS-NH$_2$ (1K) were used.

Example 7.3

A coating was formed as in Example 7.1, except that 1.25 mL (1.3 g) HDIT polyisocyanate, 20 mg PDMS-NH$_2$ (2K), and 12 mg PDMS-NH$_2$ (1K) were used.

Results:

Samples showed sliding angles of about 15°-20° for water as well as oil (75 µL and 15 µL droplets, respectively). Example 7.1 was best among these three for both water and oil.

Example 8—Synthesis of Omniphobic Polyurethanes with PDMS Component Blends at Various Curing Conditions The following examples illustrate omniphobic coatings according to the disclosure using a blend of mono-functional amine PDMS components with no further functionalization at different ratios and curing conditions.

Example 8.1

1.25 mL (1.30 g) HDIT (DESMODUR N 100A) was taken in 20 mL vial and diluted with 1 mL acetone and vortexed for less than 1 minute. To this solution, 20 mg PDMS-NH$_2$ (1K) (MW 1000 average) and 2 mg PDMS-NH$_2$ (2K) (MW 2000 average) both dissolved in acetone were added dropwise, and the mixture was stirred for 5 minutes. Then to this solution, 0.7 mL (0.71 g) polyether polyol (MULTRANOL 4011) was added followed by addition of tin(II) 2-ethylhexanoate catalyst (2 drops (12 mg)), and the mixture was stirred at 60° C. for 5 minutes. This solution was cooled and diluted with 6 mL DMC. Using N$_2$ bubbling, acetone was removed and the remaining solution was drop casted on a test substrate glass and cured at 120° C. in an oven.

Additional curing conditions were performed as follows. A coating Sample "A" was prepared as in Example 8.1, except that the coating was cured at room temperature. A coating Sample "B" was prepared as in Example 8.1, except that the coating was cured at 50° C. A coating Sample "C" was prepared as in Example 8.1, except that the coating was cured at 70° C. A coating Sample "D" was prepared as in Example 8.1, except that the final solution (1 mL) was diluted in 1 mL DMC and drop casted and cured at 120° C. for 6 hrs. A coating Sample "E" was prepared as in Example 8.1, except that the final solution (1 mL) was diluted in 2 mL DMC and drop casted and cured at 120° C. for 6 hrs.

Example 8.2

A coating was formed as in Example 8.1 (including additional curing samples A-E), except that 1.45 mL (1.51 g) HDIT polyisocyanate, 48 mg PDMS-NH$_2$ (1K), and 80 mg PDMS-NH$_2$ (2K) were used.

Example 8.3

A coating was formed as in Example 8.1 (including additional curing samples A-E), except that 1.78 mL (1.78 g) HDIT polyisocyanate, 96 mg PDMS-NH$_2$ (1K), and 160 mg PDMS-NH$_2$ (2K) were used.

Example 8.4

A coating was formed as in Example 8.1 (including additional curing samples A-E), except that 1.7 mL (1.9 g) HDIT polyisocyanate, 96 mg PDMS-NH$_2$ (1K), and 80 mg PDMS-NH$_2$ (2K) were used.

Example 8.5

A coating was formed as in Example 8.1 (including additional curing samples A-E), except that 1.45 mL (1.51 g) HDIT polyisocyanate, 96 mg PDMS-$NH_2$ (1K), and 40 mg PDMS-$NH_2$ (2K) were used.

Example 8.6

A coating was formed as in Example 8.1 (including additional curing samples A-E), except that 1.25 mL (1.30 g) HDIT polyisocyanate, 6 mg PDMS-$NH_2$ (1K), and 40 mg PDMS-$NH_2$ (2K) were used.

Example 8.7

A coating was formed as in Example 8.1 (including additional curing samples A-E), except that 1.25 mL (1.30 g) HDIT polyisocyanate, 12 mg PDMS-$NH_2$ (1K), and 40 mg PDMS-$NH_2$ (2K) were used.

Example 8.8

A coating was formed as in Example 8.1 (including additional curing samples A-E), except that 1.3 mL (1.36 g) HDIT polyisocyanate, 12 mg PDMS-$NH_2$ (1K), and 80 mg PDMS-$NH_2$ (2K) were used.

Example 8.9

A coating was formed as in Example 8.1 (including additional curing samples A-D), except that 1.25 mL (1.30 g) HDIT polyisocyanate, 2 mg PDMS-$NH_2$ (1K), and 20 mg PDMS-$NH_2$ (2K) were used.

Results:

Examples 8.3, 8.3C, 8.6, 8.6C, 8.8, and 8.8C showed 10° sliding angles for water (75 µL droplet) as well as oil (15 µL droplet), but oil droplets were slowly gliding on the surface. The "B" samples cured at 50° C. showed curing after 48 hrs, and showed 10°-15° sliding angles for water (75 µL droplet) as well as oil (15 µL droplet). Example 8.8B coatings were best amongst all for oil repellency showing high gliding ability as compared to other samples. All of the "A" samples cured at room temp showed 20°-30° sliding angles for water (75 µL droplet) and oil (15 µL droplet) repellency.

Example 9—Synthesis of Omniphobic Polyurethanes without Solvent Evaporation

The following examples illustrate omniphobic coatings according to the disclosure using a blend of mono-functional amine PDMS components with no further functionalization at different ratios and curing conditions.

Example 9.1

Polyol (MULTRANOL 4011, 0.7 mL (0.71 g) and HDIT (1.1 mL, 1.15 g) were dissolved in DMC (4 mL). The mixture heated at 70° C. for 1 h. Then the solution was cooled and 1.2 mg PDMS-$NH_2$ (1K) dissolved in 1 mL of DMC was added dropwise into it under stirring. For samples "A", "B", and "C", the solutions were stirred for 2 min, 4 min, and 10 min, respectively, and then drop casted on a glass slide. Once all DMC was evaporated, the coating was cured at 120° C. for 2.5 h. The samples exhibited average-good optical properties (heat treatment improved the optical properties), and good water and oil sliding angles.

Example 9.2

A coating was formed as in Example 9.1 (including samples A-C), except that 20 mg PDMS-$NH_2$ (2K) was used in place of PDMS-$NH_2$ (1K). The samples exhibited average optical properties, and good water and oil sliding angles.

Example 9.3

A coating was formed as in Example 9.1 (including samples A-C), except that the initial mixture was not heated at 70° C. for 1 h. The samples exhibited average-good optical properties, and good water and oil sliding angles.

Example 9.4

A coating was formed as in Example 9.3 (including samples A-C), except that 20 mg PDMS-$NH_2$ (1K) was used. The samples exhibited average-good optical properties, and good water and oil sliding angles.

Example 9.5

Polyol (MULTRANOL 4011, 0.7 mL (0.71 g) and HDIT (1.1 mL, 1.15 g) were dissolved in DMC (2 mL). The mixture heated at 70° C. for 1 h. For sample "A", the solution was cooled and 1.2 mg PDMS-$NH_2$ (1K) dissolved in 0.1 mL of acetone was added dropwise into it under stirring. For sample "B", the solution was cooled and 1.2 mg PDMS-$NH_2$ (1K) dissolved in 0.3 mL of acetone was added dropwise into it under stirring. The sample solutions were stirred for 2 min or 8 min, and then drop casted on a glass slide. Once all DMC was evaporated, the coating was cured at 120° C. for 2.5 h. The samples exhibited good optical properties, and good water and oil sliding angles.

Example 9.6

A coating was formed as in Example 9.5 (including samples A-B), except that the initial mixture was not heated at 70° C. for 1 h. The samples exhibited good optical properties, and good water and oil sliding angles.

Example 9.7

A coating was formed as in Example 9.5 (including samples A-B), except that the PDMS-$NH_2$ (1K) was dissolved in acetone instead of THF. The samples exhibited good optical properties, but bad water and oil sliding angles.

Example 9.8

A coating was formed as in Example 9.7 (including samples A-B), except that the initial mixture was not heated at 70° C. for 1 h. The samples exhibited good optical properties, but bad water and oil sliding angles.

Example 9.9

1 mL (1.04 g) HDIT was added to 0.70 mL (0.71 g) polyol (MULTRANOL 4011) followed 1.5 mL acetone into it. Then this solution was vortexed for about 1 minute until dissolution. To this solution, 1 drop (6 mg) of tin(II) 2-ethylhexanoate was added and stirred for 20 min at room temperature. To this solution, 1.2 mg PDMS-NH$_2$ (1K) (dissolved in acetone) was added dropwise and stirred at room temp for 5 min. Then 6 mL DMC was added into the mixture. Using N$_2$ bubbling, acetone was removed and the remaining solution was drop casted on a test substrate glass and cured at 120° C. in an oven.

Additional curing conditions were performed as follows. A coating Sample "A" was prepared as in Example 9.9, except that the coating was cured at 70° C. A coating Sample "B" was prepared as in Example 9.9, except that the coating was cured at 50° C. A coating Sample "C" was prepared as in Example 9.9, except that the coating was cured at room temperature.

Example 9.10

A coating was formed as in Example 9.9 (including samples A-C), except that 2.0 mg PDMS-NH$_2$ (2K) was used instead of 1.2 mg PDMS-NH$_2$ (1K).

Results:

The results for Examples 9.9 and 9.10 were generally same as between samples using PDMS-NH$_2$ (1K) or samples using PDMS-NH$_2$ (2K) for samples prepared at 70° C. The samples showed sliding angles of about 15°-20° with 4 drops of water (~80 μL) for Examples 9.9, 9.9A, 9.10 and 9.10A.

Example 10—Synthesis of Omniphobic Polyurethanes and Epoxies with Improved Barrier Properties The following examples illustrate omniphobic coatings and films according to the disclosure using a variety of different polyurethane and epoxy thermoset components in combination with functionalized PDMS as a functionalized omniphobic polymer.

Permeability (P) of a composition or film for a given pemeant is the product of the solubility (S) and the diffusion (D) coefficients of the permeants (e.g., oxygen gas or water vapor) in a polymer. For example, polypropylene is a poor barrier for oxygen because non-polar oxygen is million times more soluble in non-polar polypropylene compared to the polar water molecules. Similarly, polar polymers (e.g., PVOH, EVOH, starch) readily absorb water because of their polar nature, but they are excellent barriers against non-polar oxygen (and other gases). Due to the disparity in polarities of oxygen and water, it is challenging to design polymer compositions that simultaneously reduce the solubility (S) factor for both water and oxygen. As illustrated in the following example, however, thermoset omniphobic compositions according to the disclosure have substantially improved barrier properties in terms of both reduced water and oxygen permeabilities.

Example 10.1 (Polyurethane Siloxane Coating)

1.2 ml of Hexamethylene Diisocynate (DESMODUR N 100A) (Covestro) was taken in a 20 ml vial. It was diluted by adding 2 ml of Tetrahydrofuran (THF) (Fisher Chemicals). The solution was constantly stirred. Then Poly dimethyl siloxane-bis (3-aminopropyl) terminated (PDMS-amine) (Sigma Aldrich) was diluted with THF to 20 wt. %. Then a desired amount of this diluted PDMS-amine solution was added drop wise to the 20 ml vial while stirring. Then 0.68 ml of Polyether polyols (MULTRANOL 4011) (Covestro) was added to the 20 ml vial. The vial was then heated and stirred at 60° C. for 20 minutes. After that the vial was cooled down to room temperature and 6 ml dimethyl carbonate (Fisher chemicals) was added to it. The solution was stirred for another 2 minutes. The solvents in the solution were evaporated by bubbling process using nitrogen as the gas. These solutions were cast onto glass slide and cured at 120° C. overnight. The films were detached from the beakers and subjected to water vapor and oxygen permeability barrier tests. Four films according to the disclosure were prepared with 1, 2, 4, and 8 wt. % levels of incorporation of PDMS, and one corresponding comparative film was prepared with no PDMS. The results are summarized below in Table 1.

TABLE 1

Water and Oxygen Barrier Properties for Example 10.1

| PDMS Incorporation (wt. %) | H$_2$O Permeation (kg m/m$^2$ sec Pa) E-14 | O$_2$ Permeation (kg m/m2 sec Pa)E-17 |
|---|---|---|
| 0% | 1.51 ± 0.18 | 0.51 ± 0.62 |
| PDMS 1% | 0.57 ± 0.03 | 0.15 ± 0.03 |
| PDMS 2% | 2.38 ± 0.06 | 0.53 ± 0.03 |
| PDMS 4% | 2.56 ± 0.02 | 0.78 ± 0.05 |
| PDMS 8% | 3.86 ± 0.11 | 2.26 ± 0.22 |

Notes: Instrumentation used was MOCON Ox-Tran Model 2/21, MH for oxygen permeability measurement and MOCON Model 3/33 for water vapor permeability measurement. The permeation tests were performed at 75% RH and at 21° C. Test films were prepared at an average thickness of 1 mm. Note: Low wt. % of PDMSPU gives good barrier properties relative to higher wt. % loading of PDMS possibly because PDMS is amorphous, which adversely affects chain packing of the polymer chains when the concentration increases.

Example 10.2 (Polyurethane Siloxane Coating on PVOH Layer)

2.2 ml of Hexamethylene Diisocynate (DESMODUR N 100A) (Covestro) was taken in a 20 ml vial. It was diluted by adding 2 ml of Tetrahydrofuran (THF) (Fisher Chemicals). The solution was constantly stirred. 1% of Poly dimethyl siloxane-bis (3-aminopropyl) terminated (PDMS-amine) (Sigma Aldrich) was taken and it was diluted with THF (In this case 0.05 ml of PDMS-amine was taken and diluted with 0.2 ml of THF) in a separate vial. This diluted PDMS-amine solution was added drop wise to the 20 ml vial while stirring. Then 0.68 ml of Polyether polyols (MULTRANOL 4011) (Covestro) was added to the 20 ml vial. The vial was then heated and stirred at 60° C. for 20 minutes. After that the vial was cooled down to room temperature and 6 ml dimethyl carbonate (Fisher chemicals) was added to it. The solution was stirred for another 2 minutes. The solvents in the solution were evaporated by bubbling process using nitrogen as the purge gas. The polyurethane siloxane coating solutions were poured in a glass petri-dish. Polyvinyl alcohol ("PVOH") films were then dipped in the polyurethane siloxane solution on one side using forceps for 2 seconds, and the reverse side was optionally dipped for another 2 seconds. The PVOH film with polyurethane siloxane coatings on one or both sides was placed on top of a 250 ml beaker to air cure for 10 minutes. The beaker was then placed in the oven at 120° C. for curing for 6 hours. The test film was placed on top of the beaker so that it did not stick to the glass material. The films were detached from the glass slides and subjected to water vapor and oxygen permeability barrier tests at 23° C. and 75% RH. One film according to the disclosure was prepared with a polyurethane siloxane ("PDMS-A/PVOH") coating on one side of the PVOH film, and two comparative films were prepared: one with just PVOH ("PVOH") and one with PVOH coated on a single side with a corresponding comparative thermoset polyurethane ("PU") film prepared with no PDMS ("PU/PVOH"). The results are summarized below in Table 2.

TABLE 2

Water and Oxygen Barrier Properties for Example 10.2

| Test Film | Oxygen Permeability (kg m/m2 sec Pa) E-18 | Water Vapor Permeability (kg m/m2 sec Pa) E-14 |
|---|---|---|
| PVOH | 1.98 ± 0.82 | 2.59 ± 0.12 |
| PU/PVOH | 0.79 ± 0.12 | 1.61 ± 0.14 |
| PDMS-A/PVOH | 0.04 ± 0.01 | 0.46 ± 0.17 |

Example 10.3 (Epoxy Siloxane Coating on PVOH Layer)

0.72 g of poly (propylene glycol) bis(2-aminopropyl ether) was added in a 20 ml vial. Then 100 mg (or 0.1 ml) of PDMS Glycidal was added to the same vial. The solution was heated at 90° C. for 2 hours. The solution was then cooled to room temperature and, 2 g of Bisphenol A diglycidyl ether was added. The solution was diluted by adding 4 ml of THF. The solution was stirred at 60° C. for 2 hours and then cooled back to room temperature. The Epoxy PDMS coating solution was poured into a petri dish. PVOH films were dipped in the epoxy PDMS coating solution using forceps for 4 seconds (2 seconds front and 2 seconds back) and were placed on the rim of a 250 mL beaker. The films were allowed to cure for 10 minutes under ambient conditions before placing them in the oven for 6 hours at 120° C. The films were placed on top of the beaker to prevent films from sticking to the glass. After curing, the epoxy PDMS coated PVOH films were peeled off the 250 mL glass beaker using forceps. These films were then subjected to further characterizations for oxygen barrier properties at 23° C. and 75% RH. The results are summarized below in Table 3.

TABLE 3

Oxygen Barrier Properties for Example 10.3

| Test Film | $O_2$ Permeation (kg m/m2 sec Pa)E-18 |
|---|---|
| PVOH | 1.98 ± 0.82 |
| Epoxy/PVOH | 0.08 ± 0.01 |
| PDMS Epoxy/PVOH | 0.04 ± 0.01 |

Example 10.4 (Polyepoxy-Siloxane Coating on PLA Layer)

A polylactic acid (PLA) film was prepared as follows: 1 g PLA beads were dissolved in 10 mL chloroform at 60° C. It was then cooled down and 1 mL (100 mg) were drop casted in an aluminum pan. The casted samples were the covered and dried under ambient condition. The dried films were then put into an oven at 60° C. for 2-3 hours. The films were then detached from aluminum pan and ready for coating.

Epoxy and Epoxy/PDMS coating solutions were then prepared as follows: In a 20 mL glass vial, 680 mg bisphenol A (BPA) epoxy and 200 mg isophorone diamine were mixed and 3 mL acetonitrile solvent were added to it to form the epoxy coating solution. In a 5 mL vial, 5 mg HDI trimer biuret (UH 80; available from Sherwin-Williams) was dissolved in the 0.5 mL acetonitrile solvent and 20 mg aminofunctional PDMS (MW 2500) were added to it under stirring to form an isocyanate-functional PDMS (i.e., HDI trimer biuret with some unreacted isocyanate groups and some reacted urea groups linking to the PDMS chains) to form the PDMS coating solution. The epoxy and PDMS coating solutions were then stirred for 5 hours to get an epoxy-PDMS coating solution. PLA films were then dipped into the epoxy or epoxy/PDMS solution for 2 second. Coated samples were then air dried and put into oven at 60° C. for 6 hours. Film thicknesses were measured, and the coated PLA films were subjected to water vapor and oxygen permeability barrier tests performed in the MOCON apparatus. The results are summarized below in Table 4.

TABLE 4

Water and Oxygen Barrier Properties for Example 10.4

| Coated Film | $H_2O$ Permeation (g · mm/m² · day · atm) | $O_2$ Permeation (cc · mm/m² · day · atm) |
|---|---|---|
| PLA Neat (no coating) | 40 ± 26 | 1353 ± 293 |
| PLA-Epoxy | 11 ± 2 | 765 ± 10 |
| PLA-Epoxy/PDMS | 24 ± 22 | 731 ± 33 |

Example 11—Synthesis of Omniphobic Polyurethane Coatings with Improved Water-Absorption Properties The following examples illustrate omniphobic coatings and films according to the disclosure using a variety of different polyurethane thermoset components in combination with functionalized PDMS as a functionalized omniphobic polymer. Water absorption for the omniphobic coatings on a substrate is measured.

Preparation of Urethane and Urethane/Nanofiller Coatings without PDMS:

Polyol (MULTRANOL 4011, 0.70 mL, 2.4 mmol) was dissolved in acetone (1.0 mL) and then HDI trimer (DESMODUR N 100A, 1.1 mL, 2.5 mmol) was added to this solution. The mixture was then sonicated at room temperature for 1 h. Subsequently, 0.7 mL of this solution was cast onto a glass slide (1"×3"), which was then left at room temperature until the solvent had evaporated. After complete evaporation of the solvent, the sample was cured at 120° C. for 6 h. The urethane coating had a thickness of ~267±8 μm.

During the preparation of the urethane/nanofiller films (without PDMS), a polyol (MULTRANOL 4011, 0.70 mL, 2.4 mmol) was initially dissolved in acetone (1.0 mL). The nanofillers (nanoclay, graphene oxide (GO), or cellulose nanocrystals (CNC), 4 mg dispersed in 0.2 mL of acetone) were subsequently added to this solution and sonicated for 20 min at room temperature. HDIT (DESMODUR N 100A, 1.1 mL, 2.5 mmol) was added to this solution and stirred with a vortex mixer for ~1 min and then sonicated at room temperature for 1 h. Subsequently, 0.7 mL of this solution was cast onto a glass slide (1"×3") and left at room temperature until the solvent had evaporated. After complete evaporation of the solvent, the sample was cured at 120° C. for 6 h. The urethane coating had a thickness of ~267±8 μm.

Preparation of Omniphobic Urethane and Urethane/Nanofillers Coating Via the Top-Layer Approach:

The polyol (MULTRANOL 4011, 0.70 mL, 2.4 mmol) was dissolved in acetone (1.0 mL) and then HDIT (DESMODUR N 100A, 1.1 mL, 2.5 mmol) was added. The mixture was sonicated at room temperature for 1 h and 0.7 mL of this solution was cast onto a glass slide of (1"×3"). After solvent evaporation, the coatings were placed in an oven at 120° C. for 5 min to trigger partial crosslinking. The coatings were then cooled to room temperature. PDMS-NH$_2$ (M$_n$=2000 g/mol, 4.9 mg dissolved in 0.6 mL of acetone) was added onto the top layer using a syringe. The sample was left to allow for solvent evaporation to occur at ambient conditions, and subsequently cured at 120° C. for 6 h. The final coating had a thickness of ~267±8 μm.

The following top-layer approach was used to obtain omniphobic urethane/nanofiller coatings. First, the polyol (MULTRANOL 4011, 0.70 mL, 2.4 mmol) was dissolved in acetone (1.0 mL). A nanofiller (nanoclay, GO or CNC (4.0 mg dispersed in 0.2 mL of acetone) was then added to this solution and sonicated for 20 min at room temperature. Subsequently, HDIT (DESMODUR N 100A, 1.1 mL, 2.5 mmol) was added to this solution and vortexed for ~1 min before it was sonicated at room temperature for 1 h. A 0.7 mL portion of the resulting solution was then cast onto a glass slide with dimensions of 1"×3", and left to allow solvent evaporation to occur under ambient conditions. After solvent evaporation, the coatings were placed in an oven at 120° C. for 5 min to trigger partial crosslinking. The coatings were then cooled to room temperature. PDMS-NH$_2$ (M$_n$=2000 g/mol, 4.9 mg dissolved in 0.6 mL of acetone) was added on the top layer using syringe. The sample was left to allow solvent evaporation to proceed under ambient conditions, and then cured at 120° C. for 6 h. The final coating had a thickness of ~267±8 μm.

Preparation of Urethane and Urethane/Nanofiller Coatings Via the In Situ Mixing of PDMS:

The polyol (MULTRANOL 4011, 0.70 mL, 2.4 mmol) was dissolved in acetone (1.0 mL) and HDIT (DESMODUR N 100A, 1.1 mL, 2.5 mmol) was then added prior to the addition of PDMS-NH$_2$ (M$_n$=2000 g/mol, 4.9 mg dissolved in 0.2 mL of acetone). This mixture was subsequently sonicated at room temperature for 1 h, and then 0.6 mL of the resulting solution was cast onto a glass slide, and left to allow solvent evaporation to occur. This sample was subsequently cured at 120° C. for 6 h in an oven.

In the case of urethane/nanofiller coatings that were prepared by in situ PDMS mixing, the polyol (MULTRANOL 4011, 0.70 mL, 2.4 mmol) was first dissolved in acetone (1.0 mL) and HDIT (DESMODUR N 100A, 1.1 mL, 2.5 mmol) was then added. A nanofiller (nanoclay, GO or CNC, 4 mg dispersed in 0.2 mL of acetone) was subsequently added to this solution, which was then sonicated for 20 min at room temperature. This was followed by the addition of PDMS-NH$_2$ (M$_n$=2000 g/mol, 4.9 mg dissolved in 0.2 mL of acetone) and sonication of the resultant solution at room temperature for 1 h. Subsequently, 0.6 mL of the resulting solution was cast onto a glass slide and subsequently the solvent was allowed to evaporate prior to curing at 120° C. for 6 h in oven.

Samples PU1-PU12 according to the above procedures were prepared in aluminum baking pan. Prior to the water absorption testing, samples were first conditioned in an oven at 120° C. for 1 h without detaching it from aluminum cup. These samples were then placed in humidity chamber at 85% relative humidity and at 37° C. for different timespans, including 1, 2, 3, 4 and 24 h. The weight gain due to water vapor absorption was recorded using a microbalance. The composition, method of PDMS addition, and water absorption after 24 h (expressed as a percent) are provided in Table 5 below.

TABLE 5

Water Absorption Properties for Example 11

| Sample | Composition (weight fraction) | PDMS Addition Method | H$_2$O Absorption (weight gain, %) |
|---|---|---|---|
| PU1 | Polyol:Isocyanate (61.1:38.8) | n/a | 2.38 ± 0.31 |
| PU2 | Polyol:Isocyanate PDMS (61:38.6:0.3) | top layer | 0.06 ± 0.01 |
| PU3 | Polyol:Isocyanate:PDMS (61:38.6:0.3) | in situ | 0.34 ± 0.03 |
| PU4 | Polyol:Isocyanate Nanoclay: (61:38.6:0.3) | n/a | 2.49 ± 0.12 |
| PU5 | Polyol:Isocyanate Nanoclay:PDMS (60.8:38.6:0.2:0.3) | top layer | 0.19 ± 0.02 |
| PU6 | Polyol:Isocyanate:Nanoclay:PDMS (60.8:38.6:0.2:0.3) | in situ | 0.35 ± 0.01 |
| PU7 | Polyol:Isocyanate:CNC (61:38.6:0.3) | n/a | 2.51 ± 0.02 |
| PU8 | Polyol:Isocyanate:CNC:PDMS (60.8:38.6:0.2:0.3) | top layer | 0.17 ± 0.02 |
| PU9 | Polyol:Isocyanate:CNC:PDMS (60.8:38.6:0.2:0.3) | in situ | 0.25 ± 0.02 |
| PU10 | Polyol:Isocyanate:GO (61:38.6:0.3) | n/a | 2.73 ± 0.03 |
| PU11 | Polyol:Isocyanate:GO:PDMS (60.8:38.6:0.2:0.3) | top layer | 0.27 ± 0.01 |
| PU12 | Polyol:Isocyanate:GO:PDMS (60.8:38.6:0.2:0.3) | in situ | 2.11 ± 0.03 |

Example 12—Synthesis of Omniphobic Epoxy Coatings with Improved Water-Absorption Properties The following examples illustrate omniphobic coatings and films according to the disclosure using a variety of different epoxy thermoset components in combination with functionalized PDMS as a functionalized omniphobic polymer. Water absorption for the omniphobic coatings on a substrate is measured.

Preparation of the Epoxy Coating without PDMS:

Bisphenol A diglycidyl ether (BADGE, 0.17 g, 1.0 mmol of epoxy groups) was dissolved in acetone (1.0 mL). Poly(propylene glycol) bis(2-aminopropyl ether) (0.06 g, 0.5 mmol of the NH$_2$ groups) was then added to this solution and mixed thoroughly using a vortex mixer. This solution was subsequently stirred for 1 h at 60° C. and was then cooled down to room temperature prior to casting onto a glass slide (1"×3"). Once the solvent had evaporated under ambient conditions, the samples were cured at 120° C. for 12 h.

In the case of epoxy/nanofillers (without PDMS), the following approach was used. BADGE (0.17 g, 1.0 mmol of epoxy groups) was dissolved in acetone (1.0 mL). Poly(propylene glycol) bis(2-aminopropyl ether) (0.06 g, 0.5 mmol of amine groups) was added to this solution and mixed thoroughly using a vortex. The resultant solution was stirred at 60° C. for 20 min, and this was followed by the addition of the nanofillers (nanoclay, GO or CNC, 3.0 mg which was dispersed in 0.2 mL of acetone via sonication). This solution was subsequently sonicated at 60° C. for 1 h, and was then cooled down to room temperature prior to casting onto a glass slide (1"×3"). Once the solvent had evaporated under ambient conditions, the samples were cured at 120° C. for 12 h.

Preparation of Omniphobic Epoxy Coating Via the Top-Layer Approach:

BADGE (0.17 g, 1.0 mmol of epoxy groups) was dissolved in acetone (1.0 mL). Poly(propylene glycol) bis(2-aminopropyl ether) (0.06 g, 0.5 mmol of amine groups) was added to this solution and mixed thoroughly using a vortex mixer. This solution was further stirred for 1 h at 60° C. and was then cooled down to room temperature before it was cast onto a glass slide (1"×3"). To achieve partial crosslinking, this sample was then cured at 120° C. for 5 min in an oven, and subsequently cooled down to room temperature. A solution of PDMS-NCO (4.9 mg dissolved in 0.6 mL of acetone) was then added onto the surface of the partially cross-linked film, and this sample was left for ~20 min at room temperature until the visible solvent had evaporated. The samples were then dried in an oven at 120° C. for 12 h to achieve complete curing. The final coating contained ~2 wt % of PDMS.

The top-layer approach for fabricating the epoxy/nanofiller coatings was conducted as follows. BADGE (0.17 g, 1.0 mmol of epoxy groups) was dissolved in acetone (1.0 mL) in a vial (10 mL). Poly(propylene glycol) bis(2-aminopropyl ether) (0.06 g, 0.50 mmol of amine groups) was added to this solution and mixed thoroughly using a vortex mixer. The solution was then stirred at 60° C. for 20 min prior to the addition of a nanofiller (nanoclay, GO or CNC, 3 mg dispersed in 0.2 mL of acetone). This solution was subsequently sonicated at 60° C. for 1 h, and was then cooled down to room temperature before it was cast onto a glass slide (1"×3"). The sample was then heated for 5 min at 120° C. in an oven to trigger partial crosslinking, and subsequently allowed to cool to room temperature. A PDMS-NCO solution (4.9 mg dissolved in 0.6 mL of acetone) was then added onto the surface of the partially cross-linked film, and this sample was subsequently left at room temperature for ~20 min until the visible solvent had evaporated. The samples were subsequently dried in an oven at 120° C. for 12 h to achieve complete curing. The final coating contained ~2 wt % of PDMS.

Preparation of Epoxy and Epoxy/Nanofiller Coatings Via the In Situ Mixing of PDMS-NCO:

For the in situ coatings, a master solution PDMS-NCO was first prepared at a concentration of 75.0 mg in 3.0 mL of acetone using the procedure described above. BADGE (0.17 g, 1.0 mmol of epoxy groups) was dissolved in acetone (1.0 mL). Poly(propylene glycol) bis(2-aminopropyl ether) (0.06 g, 0.50 mmol of amine groups) was added to this solution and mixed thoroughly using a vortex mixer. PDMS-NCO (5.0 mg dissolved in 0.2 mL of acetone) was then added dropwise into the above mixture, and was subsequently sonicated at 60° C. for 1 h. The solution was cooled down to room temperature prior to casting onto a glass slide (1"×3"). Once the solvent had evaporated at room temperature, the sample was then cured at 120° C. for 12 h.

During the preparation of the epoxy/nanofiller/PDMS coatings via the in situ approach, BADGE (0.17 g, 1.0 mmol of epoxy groups) was initially dissolved in acetone (1.0 mL) and mixed with poly(propylene glycol) bis(2-aminopropyl ether) (0.06 g, 0.50 mmol of amine groups) using a vortex mixer. The nanofillers (nanoclay, GO or CNC, 3 mg dispersed in 0.2 mL of acetone) were then added. Subsequently, PDMS-NCO (5.0 mg dissolved in 0.2 mL of acetone) was added dropwise into the above mixture, and was sonicated at 60° C. for 1 h. The solution was cooled down to room temperature prior to casting onto a glass slide (1"×3"). Once the solvent had evaporated at room temperature, the sample was cured at 120° C. for 12 h.

Samples Epoxy1-Epoxy12 according to the above procedures were prepared in aluminum baking pan. Prior to the water absorption testing, samples were first conditioned in an oven at 120° C. for 1 h without detaching it from aluminum cup. These samples were then placed in humidity chamber at 85% relative humidity and at 37° C. for different timespans, including 1, 2, 3, 4 and 24 h. The weight gain due to water vapor absorption was recorded using a microbalance. The composition, method of PDMS addition, and water absorption after 24 h (expressed as a percent) are provided in Table 6 below.

TABLE 6

Water Absorption Properties for Example 11

| Sample | Composition (weight fraction) | PDMS Addition Method | $H_2O$ Absorption (weight gain, %) |
|---|---|---|---|
| Epoxy1 | Epoxy:Jeffamine (74:26) | n/a | 3.92 |
| Epoxy2 | Epoxy:Jeffamine:PDMS (72.5:25.5:2.0) | top layer | 1.02 |
| Epoxy3 | Epoxy:Jeffamine:PDMS (72.5:25.5:2.0) | in situ | 3.37 |
| Epoxy4 | Epoxy:Jeffamine:Nanoclay (72.6:25.6:1.8) | n/a | 1.47 |
| Epoxy5 | Epoxy:Jeffamine:Nanoclay:PDMS (71.1:25.1:1.8:2.0) | top layer | 0.75 |
| Epoxy6 | Epoxy:Jeffamine:Nanoclay:PDMS (71.1:25.1:1.8:2.0) | in situ | 1.12 |
| Epoxy7 | Epoxy:Jeffamine:CNC (72.6:25.7:1.7) | n/a | 1.3 |
| Epoxy8 | Epoxy:Jeffamine:CNC:PDMS (71.1:25.1:1.8:2.0) | top layer | 0.92 |
| Epoxy9 | Epoxy:Jeffamine:CNC:PDMS (71.1:25.1:1.8:2.0) | in situ | 0.92 |
| Epoxy10 | Epoxy:Jeffamine:GO (72.6:25.7:1.7) | n/a | 1.88 |
| Epoxy11 | Epoxy:Jeffamine:GO:PDMS (71.1:25.1:1.8:2.0) | top layer | 0.98 |
| Epoxy12 | Epoxy:Jeffamine:GO:PDMS (71.1:25.1:1.8:2.0) | in situ | 1.33 |

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A thermoset omniphobic composition comprising:
a thermoset polymer comprising a crosslinked backbone, the crosslinked backbone comprising:
(i) first backbone segments,
(ii) second backbone segments,
(iii) third backbone segments,
(iv) first linking groups linking the first backbone segments and the third backbone segments, and
(v) second linking groups linking the first backbone segments and the second backbone segments;
wherein:
the first backbone segments have a structure corresponding to a reaction product from at least one first thermosetting component reactive with at least one of a second thermosetting component and a functionalized omniphobic polymer having a glass transition temperature ($T_g$) of 70° C. or less,
the second backbone segments have a structure corresponding to a reaction product from at least one functionalized omniphobic polymer having a glass transition temperature ($T_g$) of 70° C. or less, the functionalized omniphobic being reactive with the first thermosetting component,
the third backbone segments have a structure corresponding to a reaction product from at least one second thermosetting component reactive with the first thermosetting component,
the first linking groups have a structure corresponding to a reaction product of a first functional group of the first thermosetting component and a second functional group of the second thermosetting component,
the second linking groups have a structure corresponding to a reaction product of the first functional group of the first thermosetting component and a third functional group of the functionalized omniphobic polymer,
the first functional group, the second functional group, and the third functional group are different from each other,
the first and third functional groups have a higher reaction rate with each other relative to the first and second functional groups with each other,
the thermoset omniphobic composition has a homogeneous structure, and
the second backbone segments are present in an amount ranging from 0.01 wt. % to 20 wt. % relative to the thermoset polymer.

2. The composition of claim 1, wherein the functional group of the functionalized omniphobic polymer is selected from the group consisting of epoxide groups, amino groups, hydroxyl groups, carboxylic groups, and combinations thereof.

3. The composition of claim 1, wherein the functionalized omniphobic polymer is selected from the group consisting of functionalized polysiloxanes, functionalized polyperfluoroethers, functionalized polybutadienes, functionalized polyisobutenes, functionalized branched polyolefins, functionalized low molecular weight polyolefins, functionalized poly(meth)acrylates, and combinations thereof.

4. The composition of claim 1, wherein the functionalized omniphobic polymer comprises a mono-functional functionalized omniphobic polymer.

5. The composition of claim 1, wherein the functionalized omniphobic polymer comprises a di-functional functionalized omniphobic polymer.

6. The composition of claim 1, wherein the functionalized omniphobic polymer comprises a poly-functional functionalized omniphobic polymer.

7. The composition of claim 1, wherein the functionalized omniphobic polymer has a glass transition temperature in a range from −150° C. to 70° C.

8. The composition of claim 1, wherein the functionalized omniphobic polymer is a liquid at a temperature in a range from 10° C. to 40° C.

9. The composition of claim 1, wherein the functionalized omniphobic polymer has a molecular weight ranging from 300 to 50,000.

10. The composition of claim 1, wherein the first thermosetting component and the second thermosetting component together correspond to a thermoset polyurethane.

11. The composition of claim 1, wherein:
the first thermosetting component comprises a polyisocyanate or a polyol; and
the second thermosetting component comprises the other of the polyisocyanate and the polyol.

12. The composition of claim 11, wherein:
the first thermosetting component comprises the polyisocyanate, and the first functional group of the first thermosetting component comprises an isocyanate group;
the second thermosetting component comprises the polyol, and the second functional group of the second thermosetting component comprises a hydroxyl group; and
the third functional group of the functionalized omniphobic polymer comprises an amino group.

13. The composition of claim 11, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

14. The composition of claim 11, wherein the polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, isosorbide, and combinations thereof.

15. The composition of claim 1, wherein the first thermosetting component and the second thermosetting component together correspond to a thermoset epoxy.

16. The composition of claim 1, wherein:
the first thermosetting component comprises a polyepoxide or an amine; and
the second thermosetting component comprises the other of the polyepoxide and the amine.

17. The composition of claim 16, wherein:
the first thermosetting component comprises the amine, and the first functional group of the first thermosetting component comprises an amino group;
the second thermosetting component comprises the polyepoxide, and the second functional group of the second thermosetting component comprises an epoxide group; and
the third functional group of the functionalized omniphobic polymer comprises an isocyanate group.

18. The composition of claim 16, wherein the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof.

19. The composition of claim 16, wherein the amine is selected from the group consisting of polyamine-substituted aromatic hydrocarbons, aliphatic hydrocarbons, cycloaliphatic hydrocarbons, ethers thereof, esters thereof, imines thereof, and combinations thereof.

20. The composition of claim 1, wherein the first thermosetting component and the second thermosetting component together correspond to an acrylic thermoset.

21. The composition of claim 1, wherein the first backbone segments are present in an amount ranging from 10 wt. % to 90 wt. % relative to the thermoset polymer.

22. The composition of claim 1, wherein the second backbone segments are present in an amount ranging from 0.2 wt. % to 8 wt. % relative to the thermoset polymer.

23. The composition of claim 1, wherein the third backbone segments are present in an amount ranging from 10 wt. % to 90 wt. % relative to the thermoset polymer.

24. The composition of claim 1, further comprising one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

25. The composition of claim 1, wherein the composition has a water contact angle in a range from 90° to 120°.

26. The composition of claim 1, wherein the composition has an oil contact angle in a range from 1° to 65°.

27. The composition of claim 1, wherein the composition has a water sliding angle in a range from 1° to 30° for a 75 μl droplet.

28. The composition of claim 1, wherein the composition has an oil sliding angle in a range from 1° to 20° for a 25 μl droplet.

29. The composition of claim 1, wherein:
the composition has a relative permeability for water vapor of 0.9 or less, relative to a corresponding composition without the functionalized omniphobic polymer; and
the composition has a relative permeability for oxygen gas of 0.9 or less, relative to a corresponding composition without the functionalized omniphobic polymer.

30. The composition of claim 1, wherein:
the composition has a relative absorption for water vapor of 0.9 or less, relative to a corresponding composition without the functionalized omniphobic polymer.

31. A coated article comprising:
(a) a substrate; and
(b) a thermoset omniphobic composite composition according to claim 1, coated on a surface of the substrate.

32. The coated article of claim 31, wherein the substrate is selected from the group of metal, plastics, a different thermoset material, glass, wood, fabric (or textile), and ceramics.

33. The coated article of claim 31, wherein the thermoset omniphobic composition has a thickness ranging from 0.01 μm to 500 μm.

34. The coated article of claim 31, wherein the thermoset omniphobic composition coating is scratch-resistant, ink-resistant, and optically clear.

35. A method for forming a thermoset omniphobic composition, the method comprising:
(a) reacting at a temperature from 20° C. to 150° C. and for a time from 5 min to 300 min (i) at least one first thermosetting component comprising a first functional group reactive with a second thermosetting component comprising a second functional group and a functionalized omniphobic polymer comprising a third functional group and having a glass transition temperature ($T_g$) of 70° C. or less, (ii) at least one functionalized omniphobic polymer comprising the third functional group and having a glass transition temperature ($T_g$) of 70° C. or less, and (iii) at least one second thermosetting component comprising the second functional group, to form a partially crosslinked reaction product;
wherein:
the first functional group, the second functional group, and the third functional group are different from each other, and
the first and third functional groups have a higher reaction rate with each other relative to the first and second functional groups with each other; and
(b) curing the partially crosslinked reaction product to form the thermoset omniphobic composition.

36. The method of claim 35, comprising mixing while reacting the at least one first thermosetting component, the at least one functionalized omniphobic polymer, and the at least one second thermosetting component to form the partially crosslinked reaction product.

37. The method of claim 35, comprising while reacting the at least one first thermosetting component, the at least one functionalized omniphobic polymer, and the at least one second thermosetting component to form the partially crosslinked reaction product:
reacting at least one polyisocyanate as the first thermosetting component and at least one amine-functional omniphobic polymer as the functionalized omniphobic polymer in the absence of at least one polyol as the second thermosetting component to form an initial reaction product; and;
reacting the at least one polyol as the second thermosetting component with the initial reaction product to form the partially crosslinked reaction product.

38. The method of claim 35, wherein curing the partially crosslinked reaction product to form the thermoset omniphobic composition comprises:
adding a casting solvent to the partially crosslinked reaction product;

applying the casting solvent and the partially crosslinked reaction product to a substrate;

drying the substrate to remove the casting solvent, thereby forming a coating of the partially crosslinked reaction product on the substrate; and curing the coating of the partially crosslinked reaction product on the substrate, thereby forming a coating of the thermoset omniphobic composite composition on the substrate.

39. The method of claim 38, comprising performing one or more of spraying, casting, rolling, and dipping to apply the casting solvent and the partially crosslinked reaction product to the substrate.

40. The method of claim 35, wherein curing the partially crosslinked reaction product to form the thermoset omniphobic composition comprises:

applying the partially crosslinked reaction product to a substrate;

drying the substrate, thereby forming a coating of the partially crosslinked reaction product on the substrate; and curing the coating of the partially crosslinked reaction product on the substrate, thereby forming a coating of the thermoset omniphobic composition on the substrate.

41. The method of claim 40, comprising performing one or more of spraying, casting, rolling, and dipping to apply the partially crosslinked reaction product to the substrate.

* * * * *